(12) United States Patent
Brown et al.

(10) Patent No.: US 9,448,915 B2
(45) Date of Patent: Sep. 20, 2016

(54) MODULAR SCRIPT DESIGNER FOR NEXT GENERATION TESTING SYSTEM

(75) Inventors: Julian M. Brown, East Dulwich (GB); Peter J. Smith, Greenwich (GB); Stephen M. Williams, Lymm (GB); Jason A. Steele, Wimbledon (GB)

(73) Assignee: Accenture Global Services Limited, Dublin (IE)

( * ) Notice: Subject to any disclaimer, the term of this patent is extended or adjusted under 35 U.S.C. 154(b) by 436 days.

(21) Appl. No.: 13/444,546

(22) Filed: Apr. 11, 2012

(65) Prior Publication Data

US 2012/0266136 A1 Oct. 18, 2012

Related U.S. Application Data

(60) Provisional application No. 61/475,057, filed on Apr. 13, 2011.

(51) Int. Cl.
G06F 9/44 (2006.01)
G06F 11/00 (2006.01)
G06F 11/36 (2006.01)

(52) U.S. Cl.
CPC ....... *G06F 11/3664* (2013.01); *G06F 11/3672* (2013.01); *G06F 11/3684* (2013.01)

(58) Field of Classification Search
CPC ........... G06F 11/3684; G06F 11/3672; G06F 11/3668
See application file for complete search history.

(56) References Cited

U.S. PATENT DOCUMENTS

| 5,629,878 | A | 5/1997 | Kobrosly | |
|---|---|---|---|---|
| 6,378,088 | B1 * | 4/2002 | Mongan | 714/39 |
| 7,343,551 | B1 * | 3/2008 | Bourdev | 715/224 |
| 7,624,380 | B2 * | 11/2009 | Okada | G06F 11/3684 714/33 |
| 7,685,576 | B2 * | 3/2010 | Hartmann | G06F 11/3684 717/105 |
| 7,743,090 | B1 * | 6/2010 | Gibson et al. | 709/202 |
| 7,823,138 | B2 * | 10/2010 | Arguelles | G06F 9/5027 714/100 |
| 8,306,195 | B2 * | 11/2012 | Gardner | G06F 8/34 379/88.08 |
| 8,365,164 | B1 * | 1/2013 | Morgenstern | G06F 8/61 717/108 |
| 8,543,981 | B2 * | 9/2013 | Ambichl | G06F 11/368 717/114 |
| 8,543,984 | B2 * | 9/2013 | Ambichl | G06F 11/3684 717/100 |
| 2003/0110472 | A1 * | 6/2003 | Alloing et al. | 717/122 |
| 2003/0236577 | A1 * | 12/2003 | Clinton | G06F 8/51 700/10 |
| 2004/0255275 | A1 * | 12/2004 | Czerwonka | 717/124 |
| 2005/0021289 | A1 * | 1/2005 | Robertson et al. | 702/182 |
| 2005/0022194 | A1 * | 1/2005 | Weir et al. | 718/100 |
| 2006/0143533 | A1 * | 6/2006 | Dresser et al. | 714/38 |
| 2006/0248504 | A1 * | 11/2006 | Hughes | G06F 11/3664 717/101 |
| 2006/0253742 | A1 * | 11/2006 | Elenburg et al. | 714/38 |
| 2008/0086543 | A1 * | 4/2008 | Carpenter | G06Q 30/0282 709/219 |

(Continued)

OTHER PUBLICATIONS

Sun Microsystems, "The Benefits of Modular Programming," 2007, pp. 1-11.*

(Continued)

*Primary Examiner* — Thuy Dao

(74) *Attorney, Agent, or Firm* — Brinks Gilson & Lione

(57) ABSTRACT

A method for modular script design includes receiving, at a modular script designer component, script information from a user, generating a list of suggested modules based on the script information, and receiving, at the modular script designer component, a selection of a next module from the user. The selection of the next module includes a selection of the next module from among the list of the suggested modules or a request for a new module. If the selection of the next module includes the request for the new module, the method further includes generating the new module.

15 Claims, 16 Drawing Sheets

(56) References Cited

U.S. PATENT DOCUMENTS

| | | | |
|---|---|---|---|
| 2009/0217302 A1* | 8/2009 | Grechanik et al. | 719/320 |
| 2010/0229155 A1* | 9/2010 | Adiyapatham et al. | 717/124 |
| 2011/0035629 A1* | 2/2011 | Noller et al. | 714/38.14 |
| 2011/0088014 A1* | 4/2011 | Becker et al. | 717/125 |
| 2011/0321013 A1* | 12/2011 | Raunstien | G06F 11/36 717/125 |
| 2012/0151448 A1* | 6/2012 | Becker et al. | 717/125 |
| 2012/0174061 A1* | 7/2012 | McCollum et al. | 717/106 |
| 2013/0074043 A1* | 3/2013 | Fu | G06F 11/3684 717/125 |
| 2013/0104106 A1* | 4/2013 | Brown et al. | 717/124 |

OTHER PUBLICATIONS

J. B. G.P. Schofield, "A programming tool to ease modular programming with C++," IEEE 2011, pp. 1-6.*

Stephen Schuman, "Toward modular programming in high-level languages," IBM Scientific Center, 1974, pp. 1-12.*

Australian Office Action dated Dec. 14, 2012 for co-pending Australian Patent Application No. 2012202093.

Australian Office Action dated Aug. 9, 2012 for co-pending Australian Patent Application No. 2012202093.

* cited by examiner

MODULAR SCRIPT DESIGNER FOR NEXT GENERATION TESTING SYSTEM

CLAIM OF PRIORITY

This application claims the benefit of U.S. Provisional Patent Application Ser. No. 61/475,057 filed Apr. 13, 2011, which is incorporated by reference in its entirety herein.

BACKGROUND OF THE INVENTION

1. Technical Field

This disclosure relates to software testing, and in particular, this disclosure relates to an integrated platform for developing, debugging, and executing tests to insure the integrity and functionality of software systems.

2. Background

The development of computer software involves a rigorous testing process to insure that the software functions as intended. During the testing process, testers write various test scripts or software test modules for performing different types of tests necessary to ensure that the computer software is functioning as designed. The testers also set up and run the test scripts while tracking the results, and report the test result to appropriate personnel. This process is inefficient and time consuming, and requires significant tester involvement.

Further, as businesses continue to rely on computer software and complex software packages, an increasing number of highly complex computer software has been developed to meet business demands. Due to the increased complexity and scale, such software programs require a large-scale testing process involving far more testers and test scripts than were required previously. Such increases are related to organizations centralizing their testing and moving to an outsourced testing model. Traditionally testing was 'embedded' into the software development life cycle for each project, but now central 'discrete' testing functions exist within organizations, which test across multiple projects and releases.

Testing tools have been developed to assist the testers in performing the various steps of the testing process. However, existing testing tools are not able to provide the required functionality and efficiency to overcome the challenges posed by the large-scale testing process.

Testing of various products and/or software products has increased in complexity and scope. In the past, relatively small groups of designers and developers, perhaps 10 to 30 in number, developed various tests for testing and verifying the function of software modules or code segments. Such small groups of individuals have been manageable. However, as the number of individuals contributing to the project becomes large, redundancy and complexity increase, which contributes to increased cost and an increase in the number of errors. Therefore, a need exists to address the above.

SUMMARY

A method for modular script design includes receiving, at a modular script designer component, script information for a modular script from a user, generating a list of suggested modules based on the script information, and receiving, at the modular script designer component, a selection of a next module from the user. The selection of the next module includes a selection of the next module from among the list of the suggested modules or a request for a new module. If the selection of the next module includes the request for the new module, the method further includes generating the new module.

Other embodiments of systems, methods, features, and their corresponding advantages will be, or will become, apparent to one with skill in the art upon examination of the following figures and detailed description. It is intended that all such additional systems, methods, features, and advantages be included within this description, be within the scope of the invention, and be protected by the following claims.

BRIEF DESCRIPTION OF THE DRAWINGS

The system may be better understood with reference to the following drawings and the description, in addition to the presentation sheets included in the appendix, which is incorporated herein in its entirety. The components in the figures are not necessarily to scale, emphasis instead being placed upon illustrating the principles of the invention. Moreover, in the figures, like-referenced numerals designate corresponding parts throughout the different views.

DETAILED DESCRIPTION OF THE PREFERRED EMBODIMENTS

Figure 1:
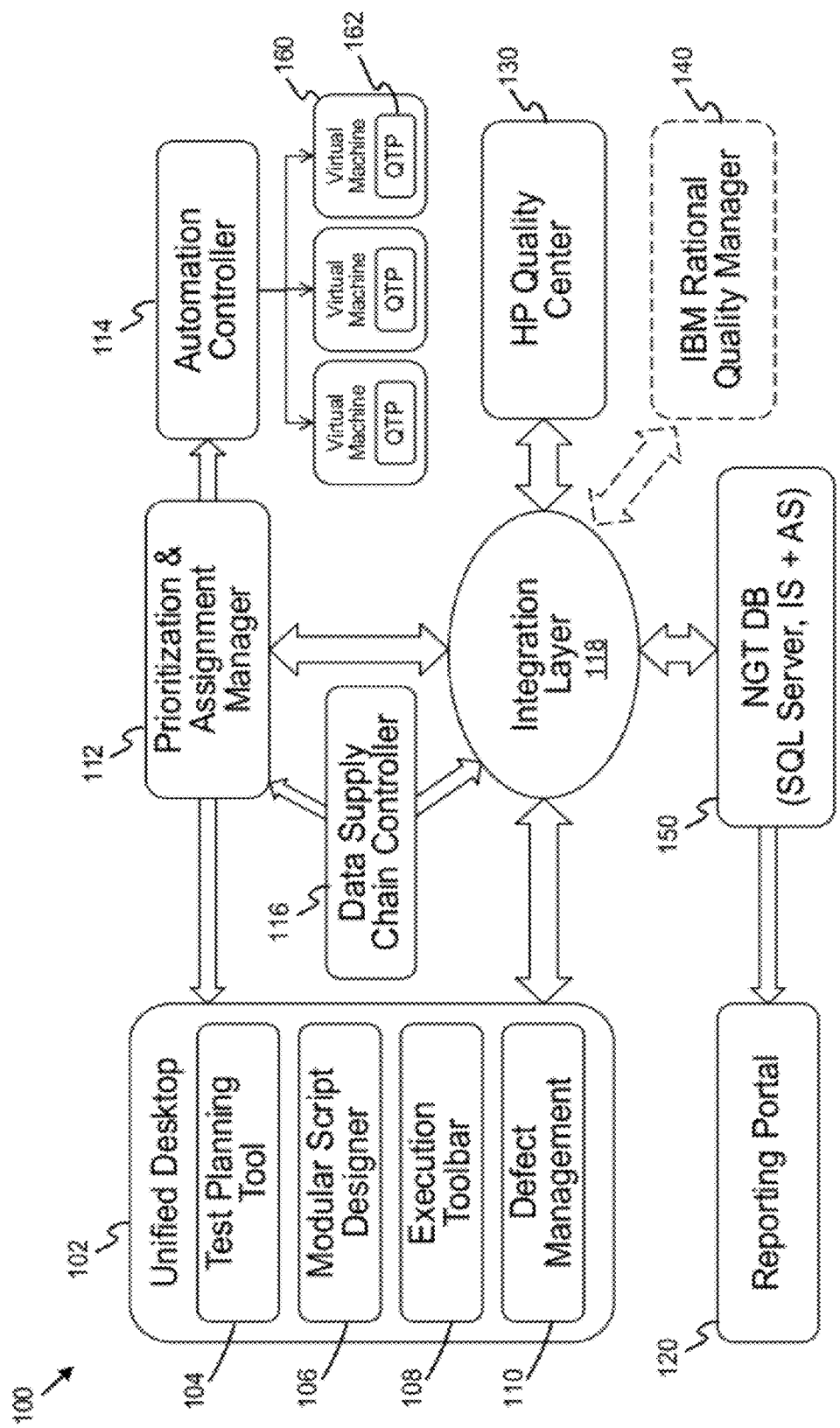
FIG. 1 shows a next generation testing ("NGT") system.

As shown in FIG. 1, a system 100 for next generation testing ("NGT system") using automation controller provides a platform allowing increased efficiency and functionality for testing computer software. The system 100 may be embodied as a system cooperating with computer hardware components and/or as a computer-implemented method.

The NGT system 100 may include a unified desktop 102 which includes a test planning tool 104, a modular script designer 106, an execution toolbar 108, and a defect management component 110. The NGT system 100 may also include a prioritization and assignment manager 112, an automation controller 114, a data supply chain controller 116, an integration layer 118, and a reporting portal 120. The integration layer may link to an existing testing tool 130, such as Hewlett Packard's HP Quality Center™, an existing test management and quality management tool 140, such as IBM Rational Quality Manager, and a database or server 150, such as a Microsoft SQL Server with SQL Integration Services and SQL Analysis Services. The NGT may also include virtual machines, 160 which interface with the automation controller 114. The virtual machines 160 may run a functional test automation tool, such as functional and regression test software 162, such as Hewlett Packard's HP QuickTest Professional (QTP). Other types of testing tools may also be used.

The NGT system 100 provides a suite of "wrapper" tools for a testing process. The NGT system 100 may consist of a set of tools that integrate with existing test tools, and extend their functionality. The NGT system 100 allows functional testing at a larger scale by delivering tools to reduce the testing effort and increase the quality of testing. The NGT system 100 may reduce testing effort by more than 20% as compared to existing testing tools 130, such as HP Quality Center™. Further the NGT system 100 may be extendible for use across multiple clients. The NGT system 100 may be built as an internal set of assets for use across clients and may be designed to allow client specific functionality to be handled through configuration and extension.

Figure 2:
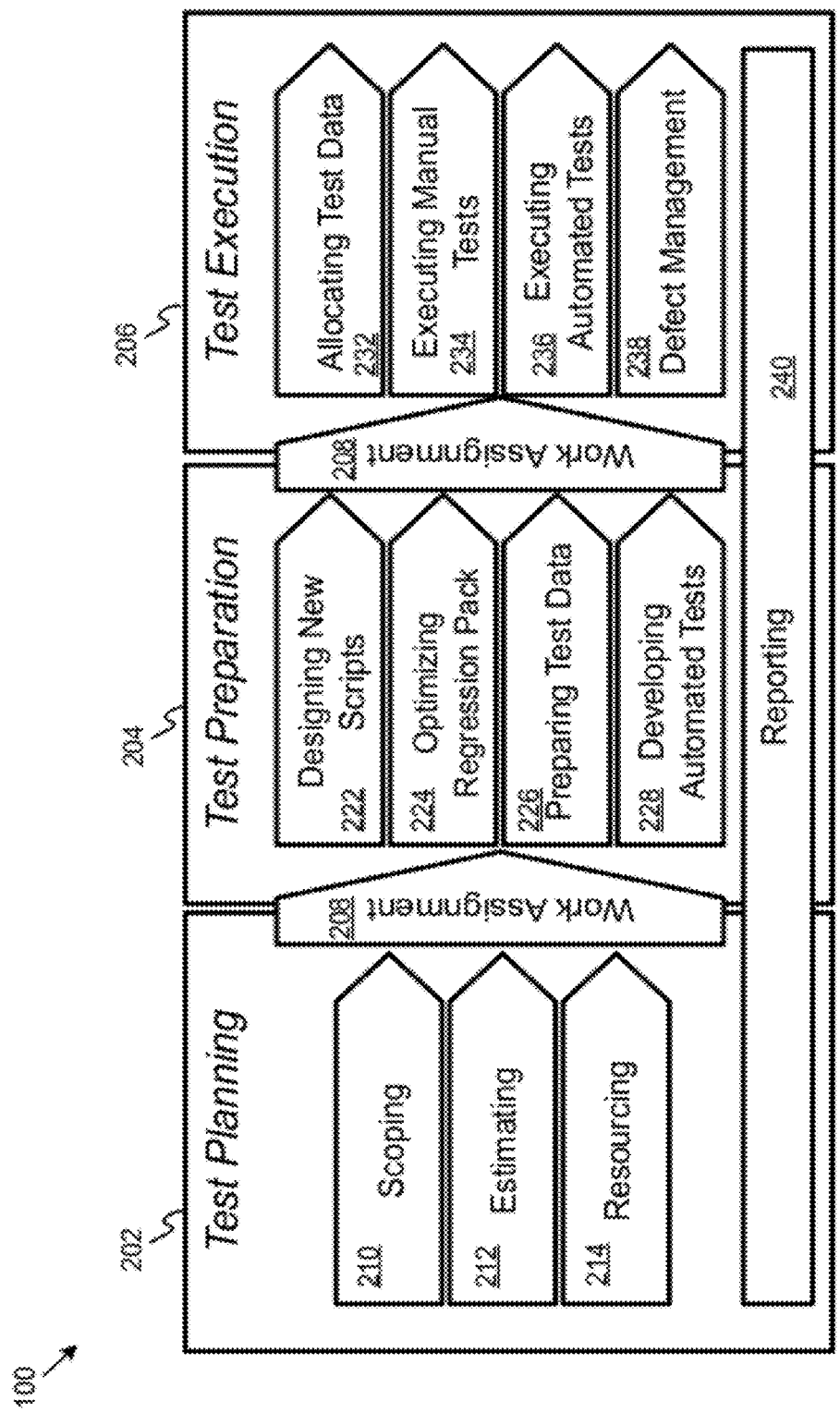
FIG. 2 is a diagram showing the overall testing process using the NGT system.

FIG. 2 is a diagram showing an overall testing process using the NGT system 100. The testing process may include a test planning stage 202, test preparation stage 204, and test execution stage 206. The NGT system 100 may provide increased efficiency and functionality across all areas of testing. Transitioning from the test planning stage 202 to the test preparation stage 204, and from the test preparation stage 204 to the test execution state 206 may involve work assignment 208. The test planning stage 202 may include scoping 210, estimating 212 and resourcing 214. The test preparation stage 204 may include designing new scripts 222, optimizing regression pack 224, preparing test data 226, developing and developing automated tests 228. The test execution stage 206 may include allocating test data 232, executing manual tests 234, executing automated tests 236, and defect management 238. The next generation testing system 100 may also include reporting capability 240 throughout all stages of the testing process.

Figure 3:
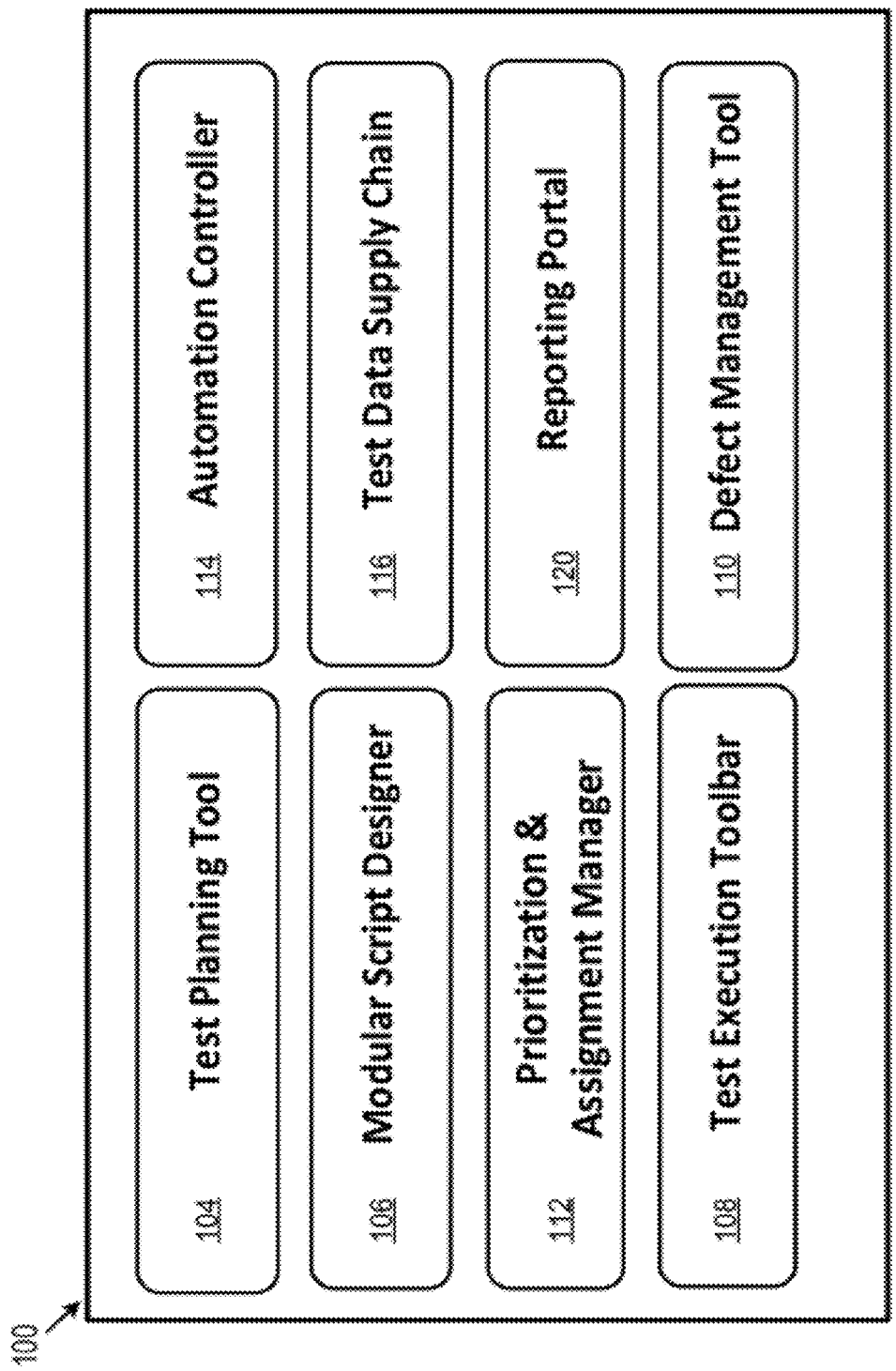
FIG. 3 shows a diagram of key components of the NGT system.

FIG. 3 shows a diagram of key components of the NGT system 100. The key components may include a test planning tool 104, a modular script designer 106, a prioritization assignment manager 112, a test execution toolbar 108, an automation controller 114, a test data supply chain 116, a reporting portal 120, and defect management tool 110.

Figure 4:
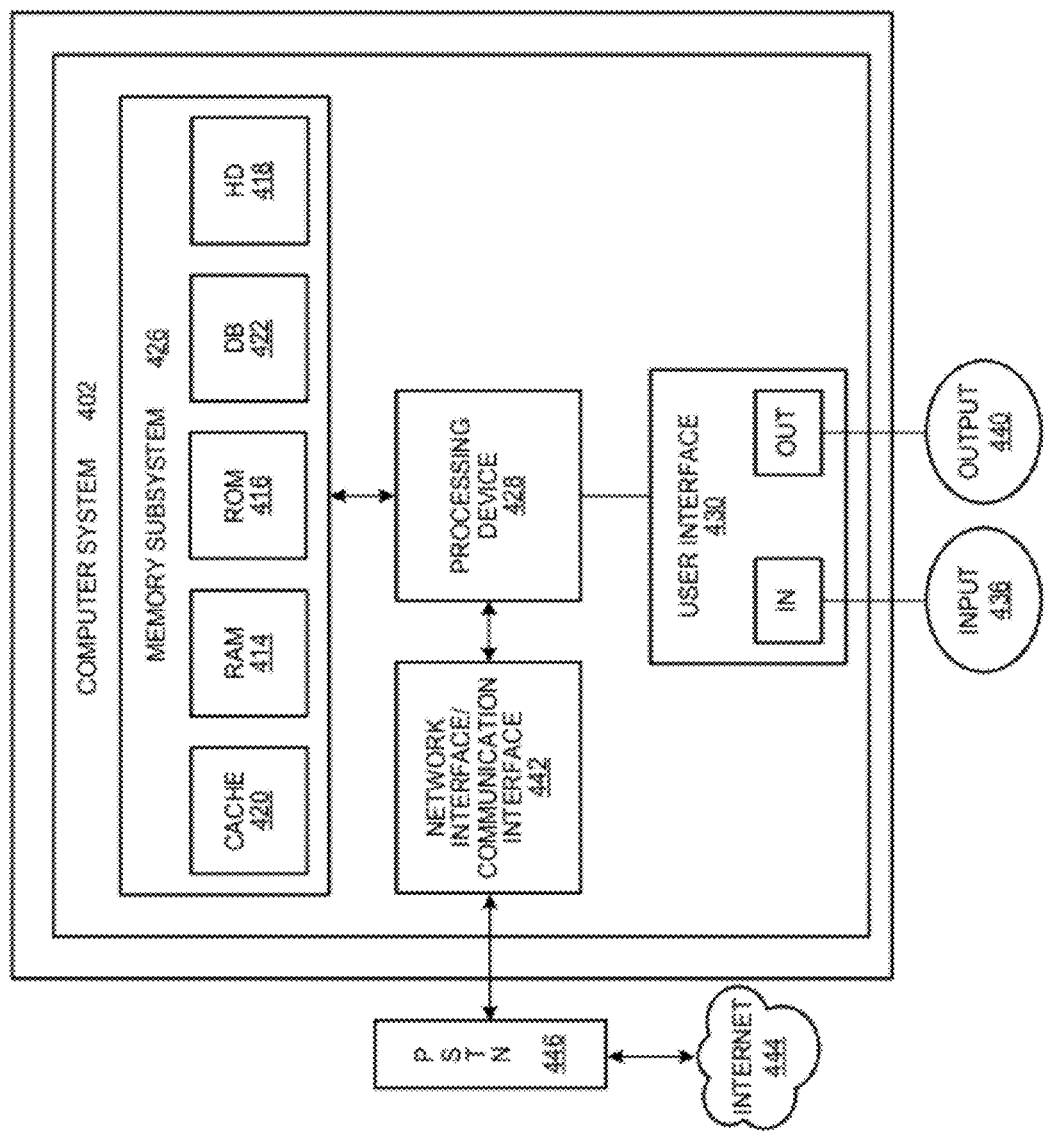
FIG. 4 is a high-level hardware block diagram of one embodiment of the NGT system.

FIG. 4 is a high-level hardware block diagram of one embodiment of the NGT system 100. The NGT system 100 may include a computer system 402, which may be a personal computer and may include various hardware components, such as RAM 414, ROM 416, hard disk storage 418, cache memory 420, database storage 422, and the like (also referred to as "memory subsystem 426"). The computer 402 may include any suitable processing device 428, such as a computer, microprocessor, RISC processor (reduced instruction set computer), CISC processor (complex instruction set computer), mainframe computer, work station, single-chip computer, distributed processor, server, controller, micro-controller, discrete logic computer, and the like, as is known in the art. For example, the processing device 428 may be an Intel Core i7® microprocessor, x86 compatible microprocessor, or equivalent device, and may be incorporated into a server, a personal computer, or any suitable computing platform.

The memory subsystem 426 may include any suitable storage components, such as RAM, EPROM (electrically programmable ROM), flash memory, dynamic memory, static memory, FIFO (first-in, first-out) memory, LIFO (last-in, first-out) memory, circular memory, semiconductor memory, bubble memory, buffer memory, disk memory, optical memory, cache memory, and the like. Any suitable form of memory may be used, whether fixed storage on a magnetic medium, storage in a semiconductor device, or remote storage accessible through a communication link. A user or system interface 430 may be coupled to the computer 402 and may include various input devices 436, such as switches selectable by the system manager and/or a keyboard. The user interface also may include suitable output devices 440, such as an LCD display, a CRT, various LED indicators, a printer, and/or a speech output device, as is known in the art.

To facilitate communication between the computer 402 and external sources, a communication interface 442 may be operatively coupled to the computer system. The communication interface 442 may be, for example, a local area network, such as an Ethernet network, intranet, Internet, or other suitable network 444. The communication interface 442 may also be connected to a public switched telephone network (PSTN) 446 or POTS (plain old telephone system), which may facilitate communication via the Internet 444. Any suitable commercially-available communication device or network may be used.

Description of the modular script designer ("MSD") 106 follows. MSD 106 combines a simple interface for developing scripts, or facilitating script creation, using a modular approach along with an approvals framework. Modularization is the process of grouping test steps into small modules that describe a piece of functionality. These modules combine together to form test scripts or cases. The MSD 106 provides intelligent module suggestions for developing test scripts. Test scripts may include one or more modules. When a module is added to a script, a list of likely 'next modules' is displayed to the user. Therefore, the MSD 106 may improve knowledge management and decrease duplicated efforts in creating modules. Users can also search for modules with an in-line search function.

The MSD 106 also allows for meta-tagging and indicating parameters in the modules. Metadata is added to modules so that the system can understand how and where the module is used. Input and output parameters are specified to enable re-use of modules and data-driven approaches. The MSD 106 also allows the specification of skills and pre-requisites associated with a module. Skills are assigned to the tests so that the system knows who will be able or qualified to execute the script. Pre-requisites (including data) are specified to track the readiness of a test for execution. The MSD 106 also provides automated approvals workflow. A centralized workflow system is used to enable modules to be approved or rejected. After a module is created or modified, the approver is notified. The approver may approve the module to be used in all scripts, for a subset of scripts, or for a single script.

Description of the test execution toolbar 108 follows. The test execution toolbar 108 may be a unified toolbar incorporating all of the tools that a tester requires. The test execution toolbar 108 may provide in-line test execution. Test scripts can be opened directly within the toolbar, which saves room on a tester's desktop and avoids certain keystrokes, such as ALT-Tabbing, between screens. Defect raising and screen capture may be part of the process. The text execution toolbar 108 may also provide an embedded approvals lists. All module/script approvals may be shown in the toolbar, and an approver can quickly open the relevant script/module for approval. The test execution toolbar 108 also allows quick access to all NGT tools. A quick launch bar may be provided to enable the tester to quickly access all of the NGT tools. The toolbar may also handle login management for NGT. A user profile section is available to change user information. The test execution toolbar 108 is also dockable with an auto-hide function. The test execution toolbar 108 may be docked to the left hand side of the screen, and it can be selected to be visible or auto-hide. An extendable framework allows additional panels to be added to the toolbar.

Description of the prioritization and assignment manager ("PAM") 112 follows. The PAM 112 provides a centralized automated prioritization of test scripts with real-time assignment logic. The PAM 112 provides configurable prioritization factors. Test scripts are prioritized based on a centralized set of factors, and the factors can be configured centrally to influence the entire test operation (for example, to improve performance against contractual key performance indicators ("KPIs")). The PAM 112 further provides a skill based assignment—it provides a pull, rather than push, approach. Testers may click 'Get Next' via a user interface to get assigned the next script to execute. The best script is chosen in real-time based on weighted assignment factors. Managers may control the skills as compared against the skills of their team members. The PAM 112 may also provide manager overrides. Managers are given a view of the scripts planned for execution by their team. They are able to change the factors of specific scripts (for example, business priority) to re-prioritize the queue and force scripts to be assigned to specific individuals. The PAM 112 may also provide a pluggable framework for new factors. New decision factors can be added by defining a new factor class. The factor may be presented through the user interface and can be weighted in the decision logic. This could be used to enable advanced 'Applied Statistic' decision models.

Description of the automation controller 114 follows. The automation controller 114 may be an automation framework for resilient off-line automation on a virtual farm, such as a computing machine in a "cloud environment." The automation controller 114 provides remote execution of test scripts. An automation controller agent may run on virtual machines ("VM's") to manage the execution of test scripts. A logging framework is used to support the execution. The automation controller 114 also may communicate with the PAM 112 to get the next script. This allows the centralized factors to apply to both manual and automated execution.

The automation controller 114 also provides intelligent selection of modules to maximize the "return on investment" or "ROI" associated with each test script that is run automatically. The automation controller 150 selects for automation the test scripts that provide the greatest ROI collectively. The choice whether to automate a particular test script using the automation controller 150 may be based on the ROI associated with the test script. For example, a particular test script may be a test script that handles initial login by a user. Because a test script that handles initial login by user may be used by hundreds of different test scripts without variation, this testing script provides a high ROI, and as such, may be a good candidate for automation. The ROI essentially is a measure of increased efficiency attained by automation of the test script. A prioritization workflow aids the automation team in assessing the next module to be automated. The user interface allows the automation team to 'check-in' and 'upgrade' automated modules.

The automation controller 114 further provides modular design and partial automation. Automation scripts may be developed as modules, and each automation module may have one or more manual modules mapped against it. Partial automation enables rapid execution of automated parts of scripts. Essentially, the automation control 150 is used where applicable to automate the execution of test scripts.

Description of the reporting portal 120 follows. The reporting portal 120 provides an automated reporting capability accessible through a central on-line portal. The reporting portal 120 may include a full Microsoft™ Business Intelligence ("BI") suite. The solution makes use of SQL Server Integration Services, SQL Server Analysis Services and SQL Server Reporting Services, which are available from Microsoft Corporation. A custom SQL Server Integration Services (SSIS) component directly communicates with external testing tools 130 such as an HP Quality Center™ which is available from Hewlett-Packard Corporation.

The reporting portal 120 also includes an off-line data warehouse to avoid testing tool degradation. An off-line data warehouse may be maintained to avoid queries directly on the external testing tool. A dimension based data model is used for simplified reporting. Further, data is pre-aggregated in a multidimensional online analytical processing ("MOLAP") database to provide quick analysis. The reporting portal 120 further provides cube-based metrics and KPIs (key process indicators). Using SS Analysis Services, measures and targets may have been pre-defined, which can be included into reports. PowerPivot, a spreadsheet add-in available from Microsoft Corporation, allows data to be quickly analyzed in spreadsheet programs, such as Microsoft Excel™ for ad-hoc reports. Further, the reporting portal 120 provides integration with solutions, such as Microsoft SharePoint™. Where data from systems other than the HP Quality Center™ is required (for example, financial/production data), the solution can receive data from solutions, such as Microsoft SharePoint™. The SSIS component allows the solution to be easily extended to direct data sources where required.

Description of the defect management tool 110 follows. The defect management tool 110 may simplify the process for raising, tracking and updating defects. The defect management tool 110 may provide a defect watch list. Toolbar based list of defects with real-time Red, Amber or Green (RAG) status indicators may be provided. Red status indicates high risk or serious project issues, amber status indicates medium risk, and green status indicates low risk. The defect management tool 110 may allow quick access to full information of the defects to see the latest status. The defect management tool 110 may also provide in-line defect raising with test history. While executing a test through the toolbar, screenshots and test steps may be captured. When a defect is raised, this information is pre-populated in the defect. Screenshots and other attachments can be uploaded directly. The defect management tool 110, also reduces "alt-tab" operations. By including core defect management in the toolbar, the defect management tool 110 is able to reduce the need to "alt-tab" into an external testing system 130, such as the HP Quality Center™. The defect management tool 110 also enables automated un-blocking of scripts to further avoid time spent in the external testing system. The defect management tool 110 further provides team based views. Managers have a 'team view' to enable them to see the defects currently impacting their team with the relevant size and status.

Description of the test planning tool 104 follows. The test planning tool 104 provides an intelligent interface for estimating, planning, selecting regression and assigning prep work. The test planning tool 104 provides assisted estimation. A three stage process is used to provide estimation at increasing levels of accuracy. Information is used from previous testing releases to improve estimates. Pluggable architecture for client-specific calculations may be used. The test planning tool 104 also provides deconstruction of requirements into tests. The test planning tool 104 assists the user in breaking down requirements into a manageable number of tests. Collaborative working capabilities allow a 'divide and conquer' approach. The test planning tool 104 further provides resource forecasting by skill. Early foresight of skills required to support the testing activities is made possible, and graphical display of availability versus demand may be presented on the user interface. The test planning tool 104 further helps to shape the test organization by promoting cross-skilling. The test planning tool 104 also provides regression pack suggestions. Using a meta-data driven approach, the system will suggest an appropriate regression pack. Risk-based testing scores can be used to size the pack accordingly.

Description of the test data supply chain 116 follows. The test data supply chain 116 automates the demand management and supply of test data. The test data supply chain 116 may provide a data catalogue. Data types are modeled and stored in a database. The test data team can check data in and out of the catalogue. Also, rules can be specified to enable basic data mining. The test data supply chain 116 also provides mapping data to test scripts. During preparation, the data type required is selected against the script. Also, using the modular script designer 106, data parameters can be mapped directly to script parameters to allow automated assignment at run-time. The test data supply chain 116 further provides monitoring of 'stock levels' and re-ordering. The test data supply chain 116 can monitor demand versus capacity for all types of data, and as data gets 'used' by test scripts, the levels are updated. The test data supply chain 116 can order additional data from the data team or via an automated provision. The test data supply chain 116 may also be integrated with the PAM 112. The stock levels can be used during prioritization to avoid running scripts that do not have available test data or where stock levels are low.

For example, if fifty specific test scripts require input data type "A" and twenty-seven specific test scripts require input data type "B," the test data supply chain 116 organizes the required data types for each script and provides the data to the test script in a "just-in-time" manner to avoid redundancy and reduce complexity. Further, such test data may change throughout the lifecycle of the testing process based on the results of a particular test. Accordingly, the test data supply chain 116 tracks the required changes and updates the data sets required for the corresponding test scripts so that as the test scripts are being executed, up-to-date test data is available to the test script.

The MSD 106 may provide the following functionalities: Define New Script: The user is able to create a new test script and enter key information about that script; Edit Existing Script: The user is able to load, or load, an existing script and edit the information/modules in that script; Select Test Data: The user is able to select test data types from the data catalogue to associate to the script; Search for Modules: The user is able to search for existing modules; Top 10 Next Modules: The MSD 106 may suggest the most likely next modules, which may be ten modules or any other number of modules, to the tester based on the existing scripts within the repository; and Create New Module: The user is able to design a new module when required.

The Create New Module may include the following sub-functionalities: Define Test Steps: Test steps may be captured against the module; Define Expected Results: Expected Results may be captured against the Test Steps; Define Input Variables: The tester may be able to define the input variables for the module and include these as required in the test steps/results; Define Output Variables: The tester may be able to define the output variables for the module and include these as required in the test steps/results.

The MSD 106 may further provide the following functionalities: Map Module Input Variables: The Input of the modules is mapped to the output of previous modules, entered by the tester at run-time or mapped to a test data field; Module Metadata: The MSD 106 allows additional configurable metadata to be specified against each module; Skill Capture: The tester is able to enter the skills required to execute the test; Pre-Requisite Capture: The MSD 106 allows the tester to enter any required pre-requisites against the script; Priority and Risk Capture: The user is able to enter the business priority, likelihood of failure and impact of failure against the test script.

MSD 106 may further provide functionalities, such as allowing users to: clone test scripts, save scripts as drafts, view legacy steps, easily re-order modules in the script, mark modules as favorite, view favorite modules, submit modules to module approvers, save modules as draft, define source of input and output variable as a fixed value, mark scripts as not requiring review, attach documents or images to scripts, and cancel creation of a script. The MSD 106 may also ensure no modules are created with the same name. The MSD 106 may provide fewer, additional, or other functionalities.

Figure 5:
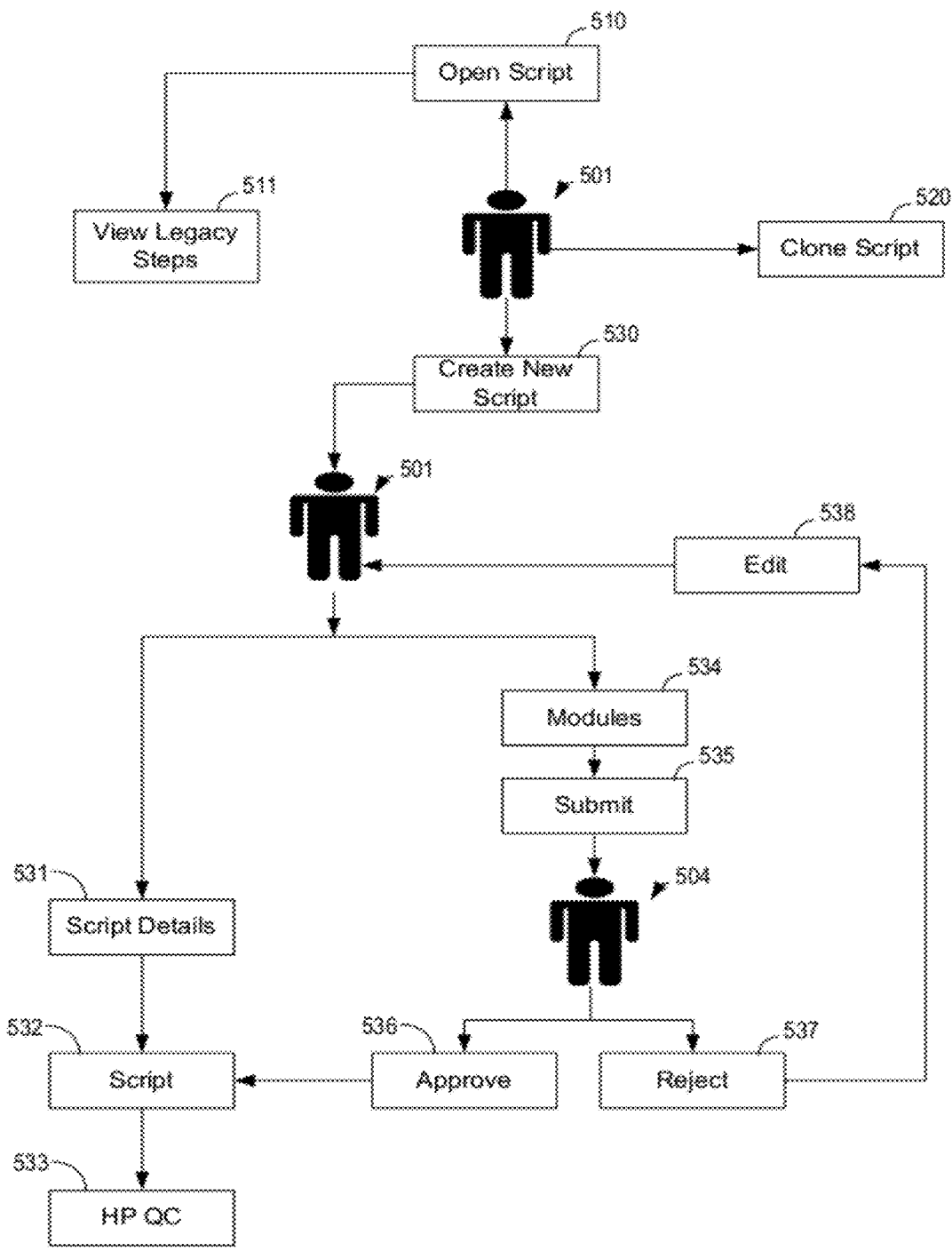
FIG. 5 shows a logical diagram of an embodiment of a modular script designer ("MSD").

FIG. 5 shows a logical diagram of an embodiment of the MSD 106. Using the MSD 106, a tester 501 may open or access scripts 510 that have already been created. The MSD 106 also allows the tester 501 to clone or duplicate existing scripts 520, by allowing the tester 501 to search for a script using script IDs or by browsing a test plan database or a test lab database, which are databases in which the test scripts are stored. The MSD 106 may further allow the tester 501 to view legacy steps 511, after the tester 501 opens a script 510. The tester 501 can convert, using the MSD 106, a legacy script to a next generation testing script by adding details and modules to the legacy script. A legacy script is a script that has not been modularized. The tester 501 may also view legacy steps using the MSD 106 and convert the legacy steps into modules, if such modules are not already present in the legacy script.

The MSD 106 may further allow the tester 501 to create new scripts 530. To create a new script 530 in the MSD 106, the tester 501 may enter script details 531, including a unique script name, a brief description of script capabilities and skill details. Skill details may include the skills required to execute the script successfully. At 532, the tester 501 may specify, in the MSD 106, input and output variables for the script, and review all data that the tester 501 inputted for the script, select an approver for the script and attach any data that the script may require. The tester 501 may submit the script to a testing tool 533, such as the HP Quality Center™.

The MSD 106 also allows the tester 501 to input modules into the test script. The MSD 106 may suggest to the tester 501 modules to be added to the script. At 534, the tester 501 may also use the MSD 106 to search for other modules to add to the script, create a new module, edit existing modules, or clone existing modules. The MSD 106 may also store the tester's 501 favorite modules. The MSD 106 may allow the tester 501 to add selected, newly created, edited, or cloned modules to the script. The tester 501 may optionally submit a module 535 to an approver 504, who may be a peer reviewer, such as a test lead. The approver 504 may provide comments for the script and may approve the module 536 or reject the module 537. If the approver 504 rejects the module 537, the approver 504 may distribute the module back to the tester for editing 538, and the module may only be edited from the point where the module was submitted 535. A rejected module is inactive, which means that the module cannot be searched for and cannot be used. The tester 501 may edit the script 538 based on comments from the approver 504. If the approver 504 accepts the module 536, the module is marked as ready for test, which means the module is ready for execution, and added to the script.

In a specific embodiment, the MSD 106 may provide the following approval process for approving a newly created module. When the tester 501 submits a module for approval, the MSD 106 may set a status indicator of the module to pending approval and alert an approver 504 to review the module. The tester 501 may designate an individual to be the approver 504, or the MSD 106 may select an approver 504 based on a role of the approver and skills required for the module. When the approver 504 approves the module, the MSD 106 may set the status indicator of the module to approved for use and the module is then available for use in other scripts and is searchable by users of the MSD 106. The approver may also amend the module before approving the module. When the approver 504 rejects a module, the MSD 106 may prompt the approver to enter a reason for rejection and sets the status indicator of the module to rejected, and alerts the tester that the approver rejected the module. The tester 501 may edit or update the rejected module in the MSD 106. The tester 501 may edit or update the rejected module and submit the module for review again, or the tester 501 may remove the rejected module from the script, in which case the MSD 106 sets the status indicator of the rejected module to inactive or deletes the rejected module.

Figure 6:
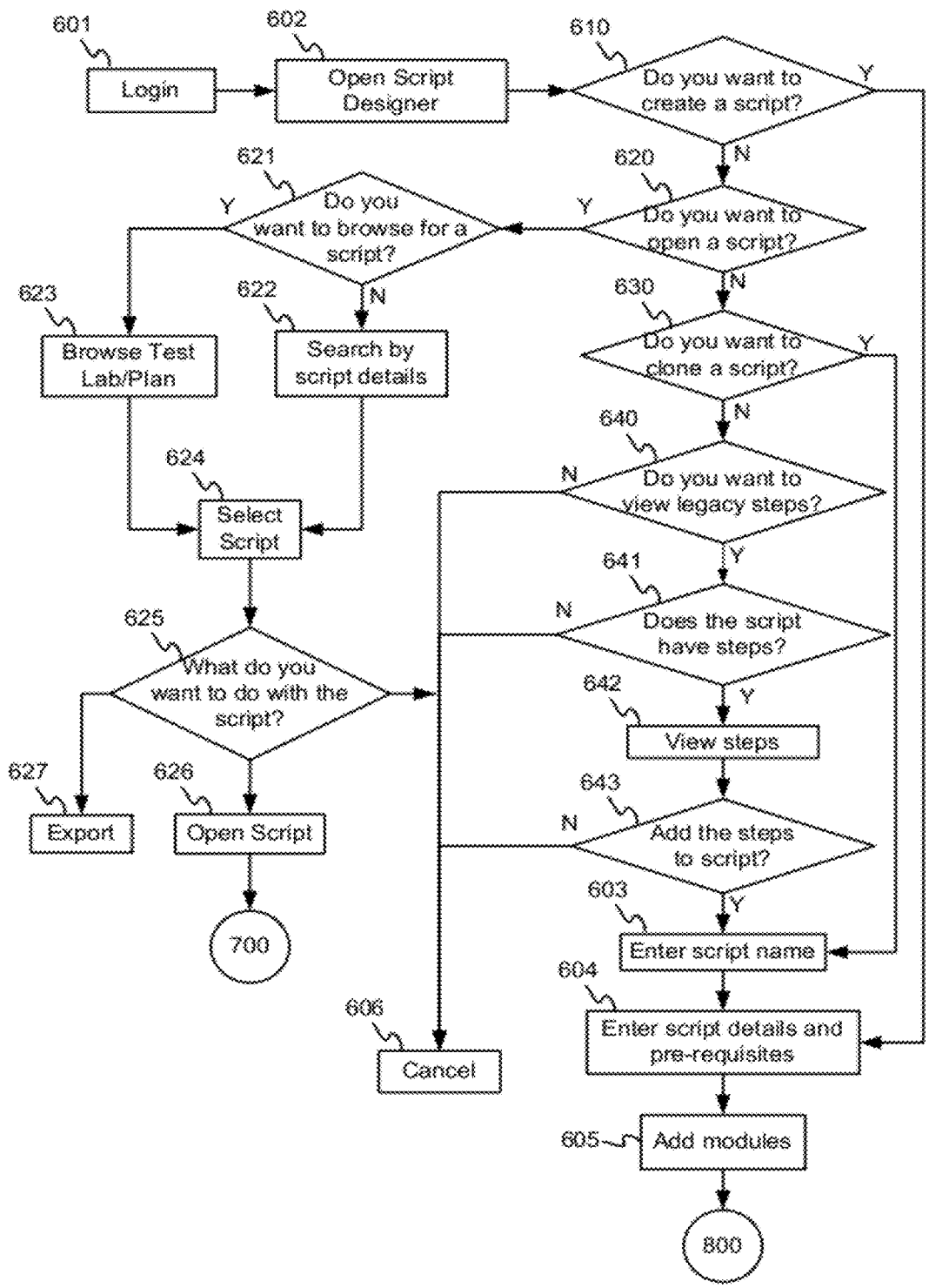
FIGS. 6-9 show logical diagrams of a user interface of an embodiment of the MSD.
Figure 7:
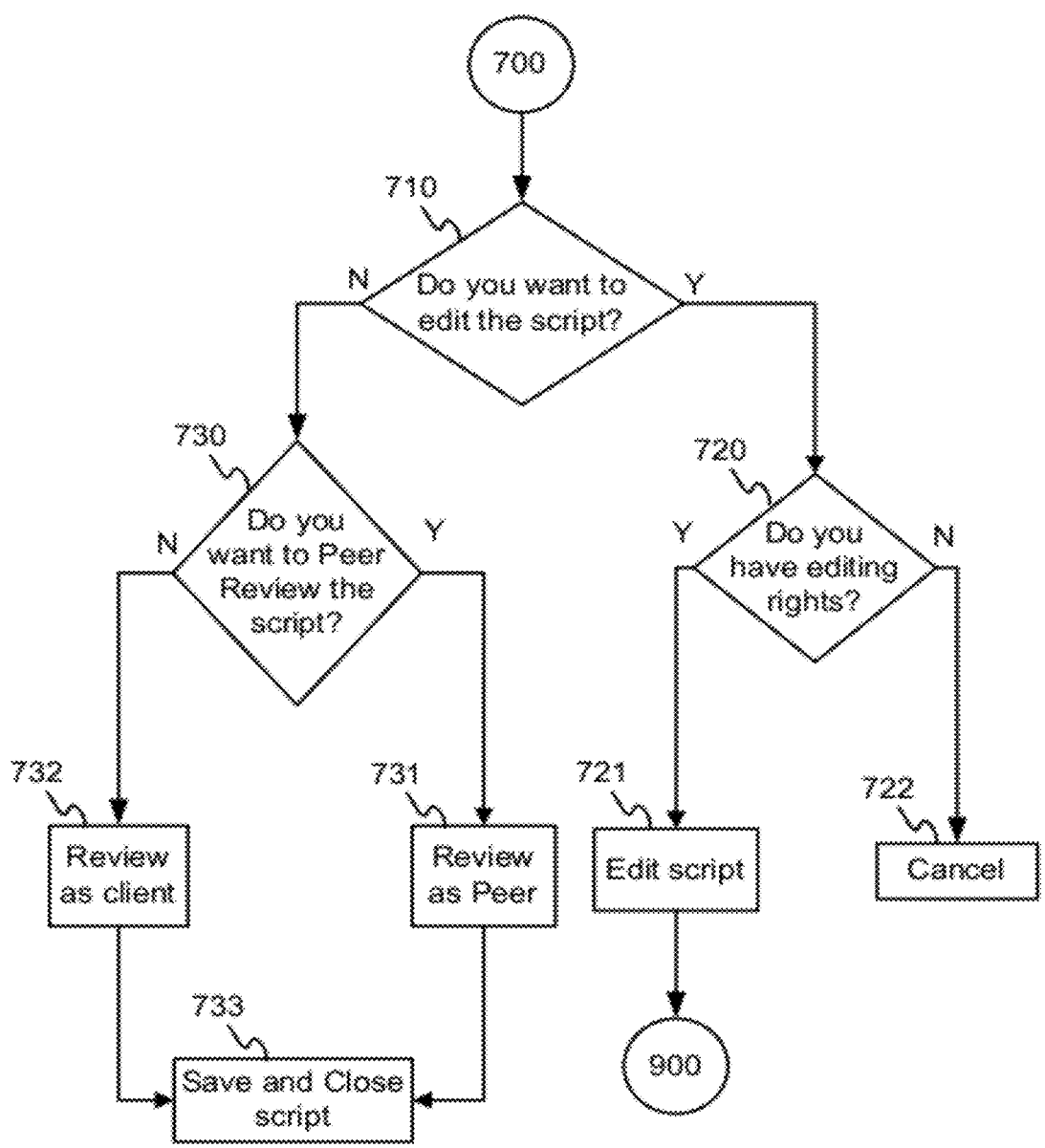
Figure 8:
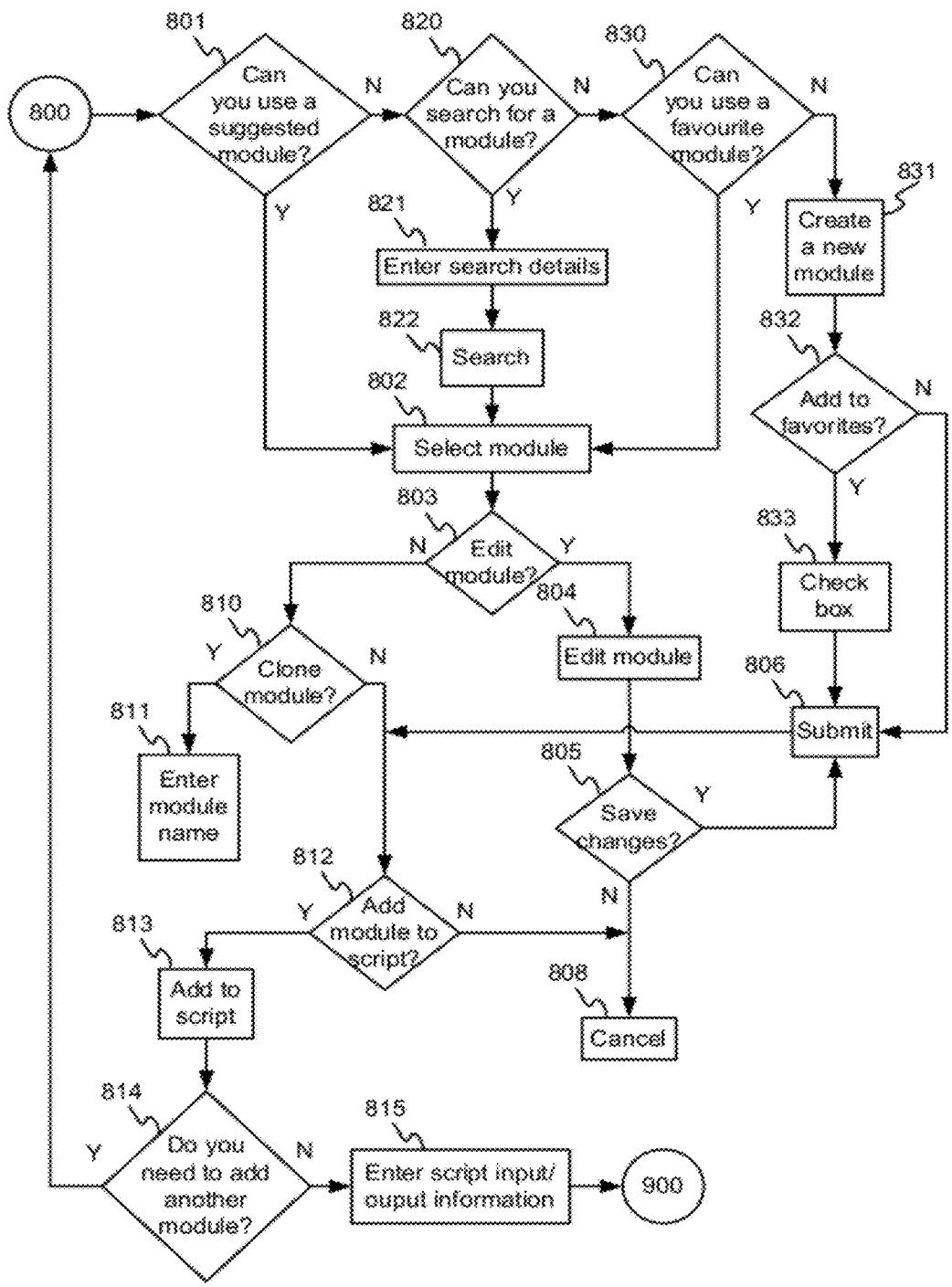

FIGS. 6, 7, 8 and 9 show a logical diagram of an embodiment of the MSD 106. As shown in FIG. 6, the MSD 106 may prompt the user to login 601 and open the modular script designer 602. Then, the MSD 106 may prompt the user to choose whether to create a new script 610, open an existing script 620, clone an existing script 630, or view legacy steps 640. If the user chooses to create a script, the MSD may prompt the user to enter script details and pre-requisites 604 and add modules 605. If the user chooses to open an existing script 620, the MSD 106 may prompt the user to search for a script by script details 622 or browse a test lab database or test plan database 623 and display available scripts to the user. Then, the user may select a script 624 in the MSD 106, and the MSD 106 may give the user options as to what to do with the script 625, including the options to open the script 626, export the script to an external program 627 (such as Microsoft Excel, or another program for viewing the script), or cancel the operation 606. If the user opens the script 626, the MSD 106 continues with the script creation process 700, as shown in FIG. 7. If the user chooses to clone a script 630, the MSD 106 may prompt the user to enter script details 604 and add modules to the script 605. The functional test automation tool 162 may store scripts that have no steps or modules, for example, some legacy scripts or scripts that include only script information, but no modules. Thus, if the user chooses to view legacy steps 640, the MSD 106 may determine whether the legacy scripts have any steps 641 and allow the user to view available legacy steps 642, add user selected legacy steps to the script 643 or cancel the operation 606. If the user adds steps to the script 643, the MSD 106 may prompt the user to enter script details and pre-requisites 604 and add modules 605. After the user adds modules 605, the MSD 106 guides the user through the next steps in the script creation process 800 (FIG. 8).

FIG. 7 shows a logical diagram of an embodiment of the MSD 106 continued from FIG. 6. After the user opens the script 626 in FIG. 6, the MSD 106 continues the script creation process 700 and gives the user the option to edit the script 710. If the user chooses to edit the script, the MSD 106 may determine whether the user has editing rights 720. If the user has editing rights, the MSD 106 may allow the user to edit the script 721, and continue with completing the script creation process 900. If the user does not have editing rights, the MSD 106 allows the user to cancel the operation 722.

FIG. 8 shows a logical diagram of an embodiment of the MSD 106 continued from FIG. 6. After the user adds modules to the script 605 in FIG. 6, the MSD 106 may guide the user through the next steps in the script creation process 800. The MSD 106 may allow the user to use a suggested module 801. If the user can use a suggested module 801, the user may select a module 802 from suggested existing modules, and the MSD 106 gives the user the option to edit the module 803. If the user edits the module 804, the MSD 106 prompts the user to save changes 805 and submit the module 806. The MSD 106 may also allow the user to cancel changes 808. If the user does not edit the module at 803, the MSD 106 prompts the user to determine whether to clone the module 810. If the user clones the module 810, the MSD 106 prompts the user to enter a module name 811. If the user chooses not to clone the module 810, then the MSD 106 prompts the user to add the module to the script 812. After the module is added to the script 813, the MSD 106 gives the user the option to add another module 814. If the user does not add any other modules, the MSD 106 prompts the user to enter script input/output information and continue with completing the script creation process 900.

The MSD 106 may allow the user to search for a module 820 by prompting the user to enter search details 821, perform the search 822 and display the search results to the user. Then, the MSD 106 may allow the user to select a module 802 from existing modules in the search results, and give the user the option to edit the module 803.

The MSD 106 may also allow a user to use a favorite module 830. The MSD 106 allows the user to select a module 802 from existing modules and gives the user the option to edit the module 803. If the user cannot use any existing modules (e.g., a suggested module 801, a module from search results 820, or a favorite module 830), the user may use the MSD 106 to create a new module 831. After the user creates a new module 831, the MSD 106 may prompt the user to add the module to favorites 832. The user may check a box 833 to add the module to favorites and then submit the module 806. Alternatively, the user may submit the module 806 without adding the module to favorites. After the module is submitted 806, the MSD 106 may prompt the user to cancel 808 or add the module to the script 812, add other modules 814, enter script input/output information 815, and complete the script creation process 900.

Figure 9:
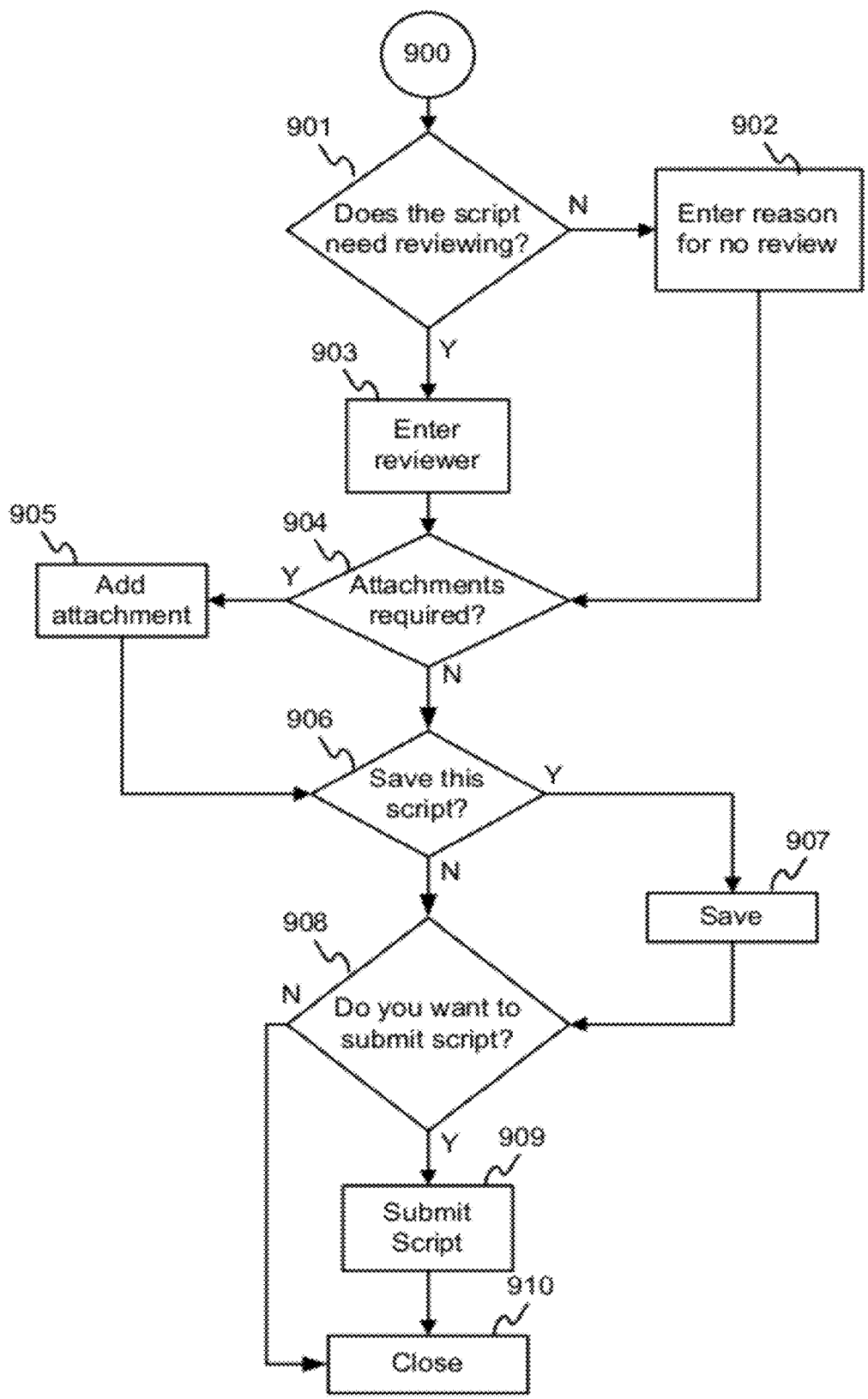

FIG. 9 shows a logical diagram of an embodiment of the MSD 106 continued from FIGS. 7 and 8. After a user edits the script 721 or finishes adding modules to the script 814 and enters script input/output information 815, the MSD 106 may prompt the user to indicate whether the script needs reviewing 901. If the user indicates that the script does not need reviewing, the MSD 106 prompts the user to enter a reason for no review 902, before allowing the user to proceed. If the user indicates that the script does need reviewing, the MSD 106 prompts the user to enter the name of the approver 903. After the user enters script review information, the MSD 106 prompts the user for required attachments 904, and allows the user to add attachments 905 or proceed without adding attachments. The attachments may include a screenshot, a file, or a document to show the results of the script. Then, the MSD 106 prompts the user to save the script 906, and allows the user to complete steps for saving the script 907. Then, the MSD 106 prompts the user to submit the script 908, and gives the user the option to complete steps for submitting the script 909 or close the modular script designer 910 without submitting the script.

Figure 10:
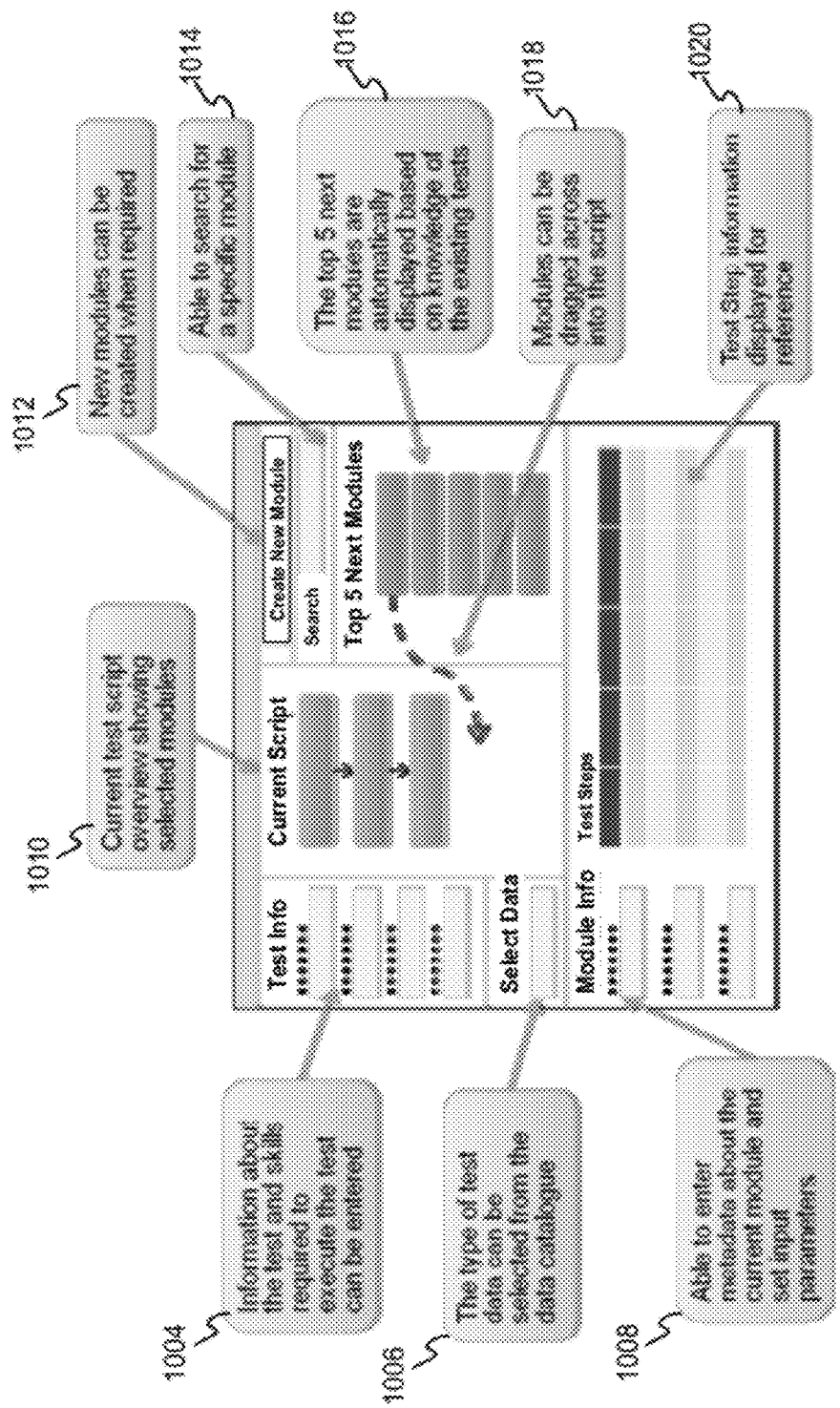
FIG. 10 shows a logical diagram of a user interface of an embodiment of the modular script designer.

FIG. 10 is a logical diagram of a user interface of a specific embodiment of the MSD 106. The MSD 106 may allow the tester to quickly design new scripts based on an existing repository of modules. Where a new module is required, the tester may be able to create that module within the MSD 106. Using the MSD 106, the tester may enter information about the test and skills required to execute the test 1004. The tester may select the type of test data from a data catalogue 1006. The tester is also able to enter metadata about the current module and set input parameters for the module 1008. MSD 106 may also show an overview of the current test script. The overview may show the modules selected for the current test script 1010. New modules can be created when required 1012 using the MSD 106, and the tester is able to search for a specific module 1014. The MSD 106 may automatically also show the top five next modules, which the tester is likely to use next 1016. Any other number of possible next modules may be displayed. The likely next modules are determined based on knowledge of the existing tests. The MSD 106 may allow a tester to drag and drop modules into the script 1018. The MSD 106 may also display test step information for a testers' reference 1020.

Figure 11:
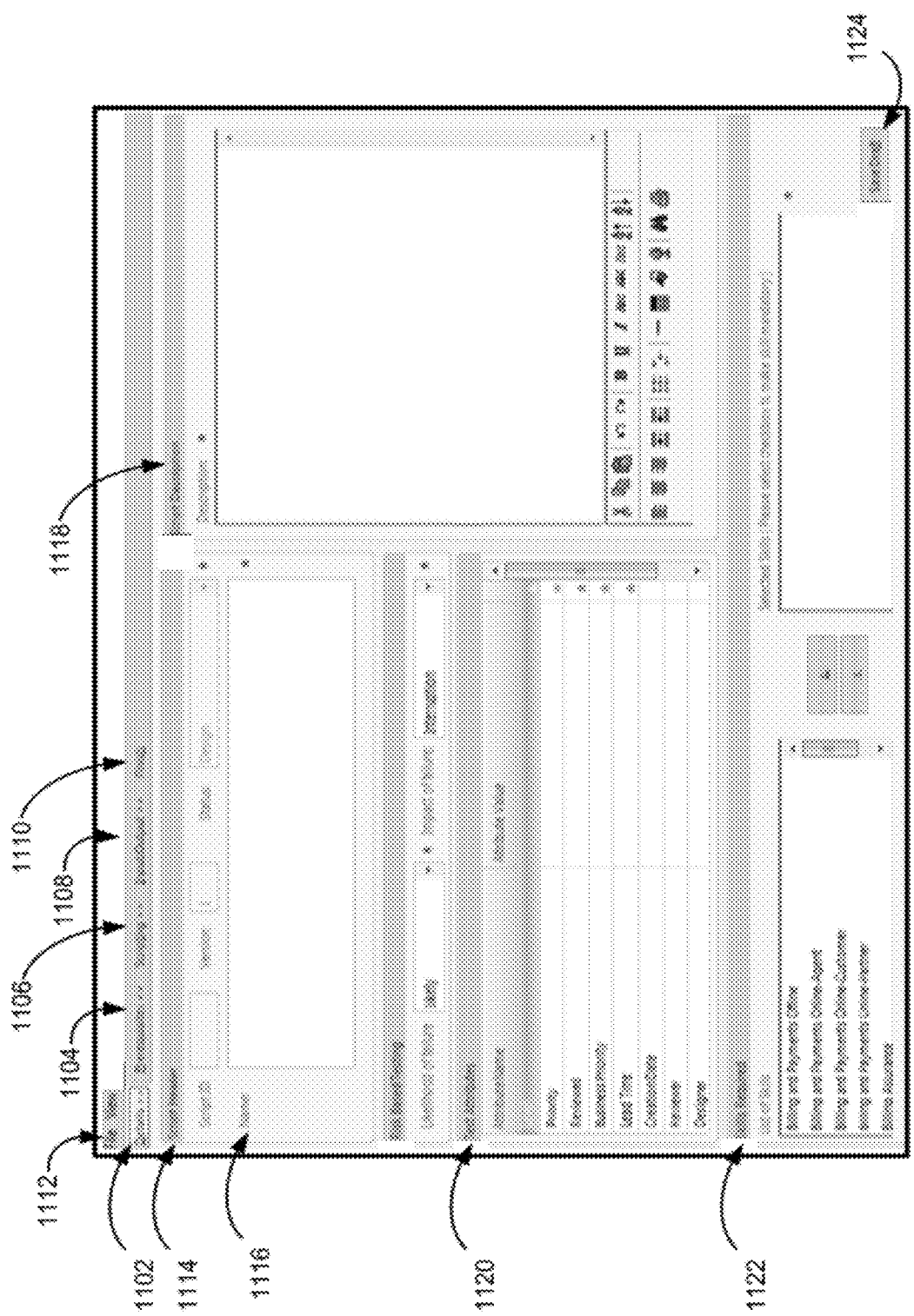
FIGS. 11-13 show diagrams of various features of an embodiment of the MSD.

FIG. 11 shows a screen shot 1100 of an embodiment of the MSD 106. The user interface may include a plurality of screens, or tabs, including a Details tab 1102, a Prerequisites tab 1104, a Scripting tab 1106 shown in more detail in FIG. 11, an Input/Output tab 1108, and a Finish tab 1110. The plurality of screens, or tabs, may guide the user through the script design process by displaying options and information to user and prompting the user to input information to create or design a script. For example, the user may begin on the Details tab 1102 by clicking a File button to access and choose from a drop down list of functions, including Open Script, New Script, View Script, Clone Script or Saved Drafts. The tester may also input, on the Details tab 1102, key information about the script. The key information may include script header 1114, a script name 1116, a description of the script 1118, names and values of test attributes 1120, skills required to complete script execution 1122, and a requirement reference for the script. The user may select required skills 1122 from a list of skills displayed on the Design tab 1102. The required skills 1122 may later be used to assign the scripts to relevant, or qualified, testers and approvers. The Details tab 1102 may further include a Save Draft button 1124, which the user may click to save the script information entered. On the Prerequisites tab 1104, the MSD 106 may display and allow the user to modify prerequisites for executing the script, which may include data type, data comments and other prerequisites. Other embodiments may include fewer, additional or alternative screens, or tabs, to display script options and information to the user, and to accept user input regarding scripts.

Figure 12:
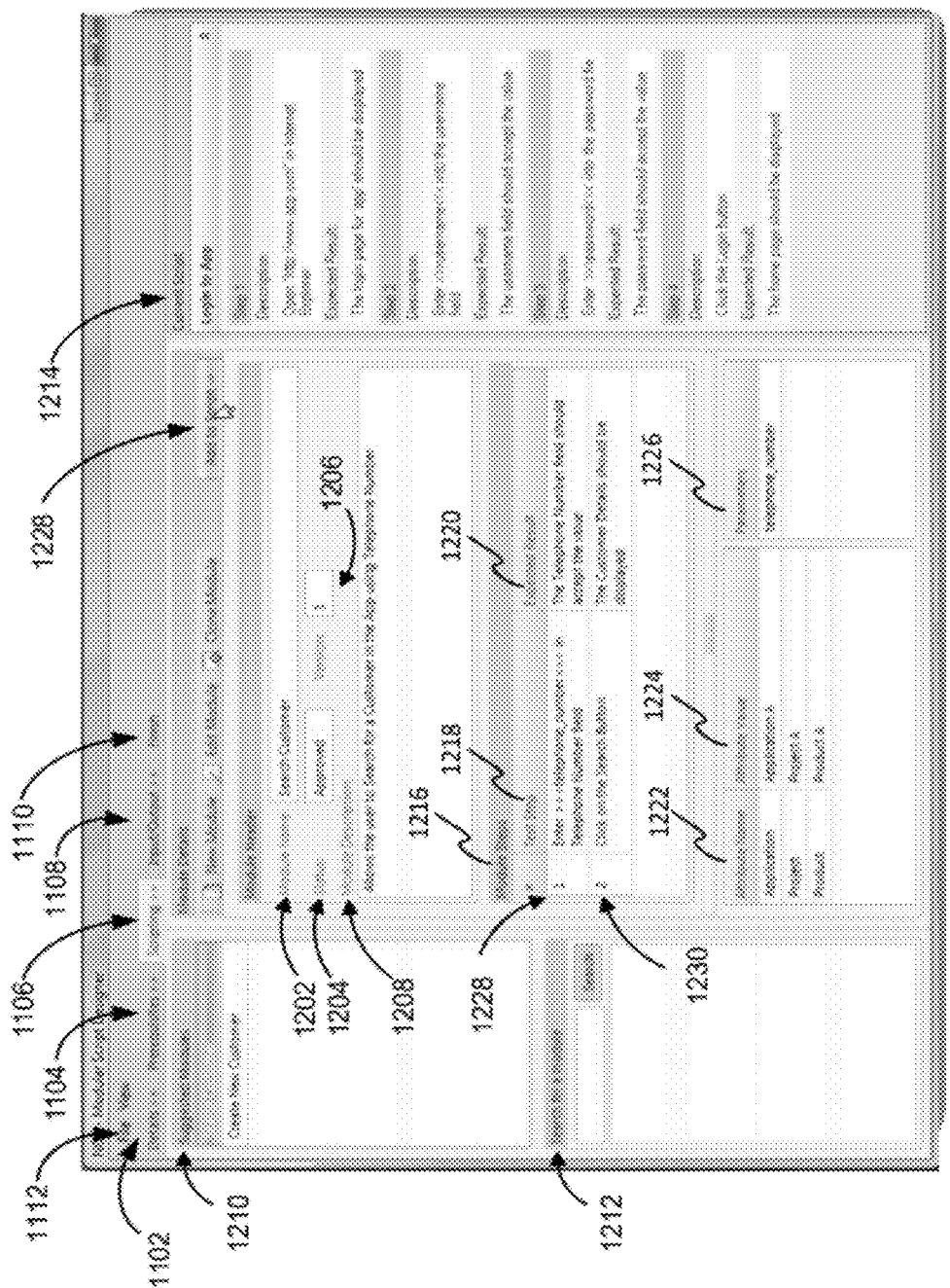

As shown in FIG. 12, the Scripting tab 1106 may display to the user all modules that are in the test script, and allow the user to add a module to the script by creating a new module, editing an existing module, or cloning an existing module. The user may also input data regarding a module, including, for example, a module name 1202, a status of the module 1204, a version of the module 1206, and a module description 1208. The user interface may further display to the user a plurality of options in panes, including suggested modules 1210 to include in the script and the option to search for modules 1212.

The user may select a module from the suggested modules 1210 by clicking and dragging a module of choice into a Current Script field 1214. The user may input additional information regarding the module, including components to which the module is linked (pulled from a configuration management database (CMDB) and any other metadata). The user interface may display to the user other information regarding the script, including for example, module steps 1216, test steps for each module step 1218, expected results for each module step 1220, current script steps 1214, attribute names 1222, attribute values 1224, and parameters 1226. The user may click the "Add to Script" button 1228 to add a module to the script.

The MSD 106 updates the list of suggested modules based on the last module in the script. If the script has no modules, the MSD 106 may provide a list of the most popular modules to be used as the first step in the script. For example, the MSD 106 may suggest a popular first module such as "Log in to App." If one or more modules are in the script, the MSD 106 may suggest popular modules that follow the last module listed in the script. The MSD 106 may add the user selected module from the list of suggested modules to the script, and display the details of the selected module to the user for review and modification. The details may include, for example, the steps in a given module, the attributes for that module and the module's parameters. Attributes can be hidden to allow more space to review the steps. After reviewing the details, the tester can add the selected module to the test script by clicking "Add to Script". The details of each step in the current script may be shown in a pane, such as a Current Script pane 1202, for the tester to view the entire script as the tester progresses. After the tester adds the selected module to the script, the MSD 106 may update the suggested module panes to show the most likely next steps, or modules, in the script. The MSD 106 may determine, based on the order of modules in other existing scripts, which modules are commonly added after the selected module. The MSD 106 allows the tester to develop the script by adding modules to the script, changing the order of modules in the Current Script pane 1202, or removing modules from the Current Script pane 1202.

On the Input/Output tab 1108, the MSD 106 may display a list of all input/put parameters associated with the test script. The tester may amend the source for the input/output parameters by selecting a parameter to change. For example, the tester may change an input parameter to a fixed value. Fixed values are entered directly into the "Value" field and are stored with the script. Alternatively, the user may change the source of the input parameter to "User Defined."

On the Finish tab 1110, the MSD 106 displays to the tester a summary of the details for the test script. The MSD 106 may present the new module to the tester so that the tester can add the new module to the current script. The user may select one of their peers to review the script. When the script is submitted for review, the MSD 106 triggers an approval workflow to ensure that modules of the script are not incorrectly created. The user may also browse the test tool to decide where to store the script that has been developed. The MSD 106 allows the tester to add attachments to the script and submit the script for peer review. The MSD 106 may allow the tester to enter a reason for no review and proceed with submitting the test script.

Figure 13:
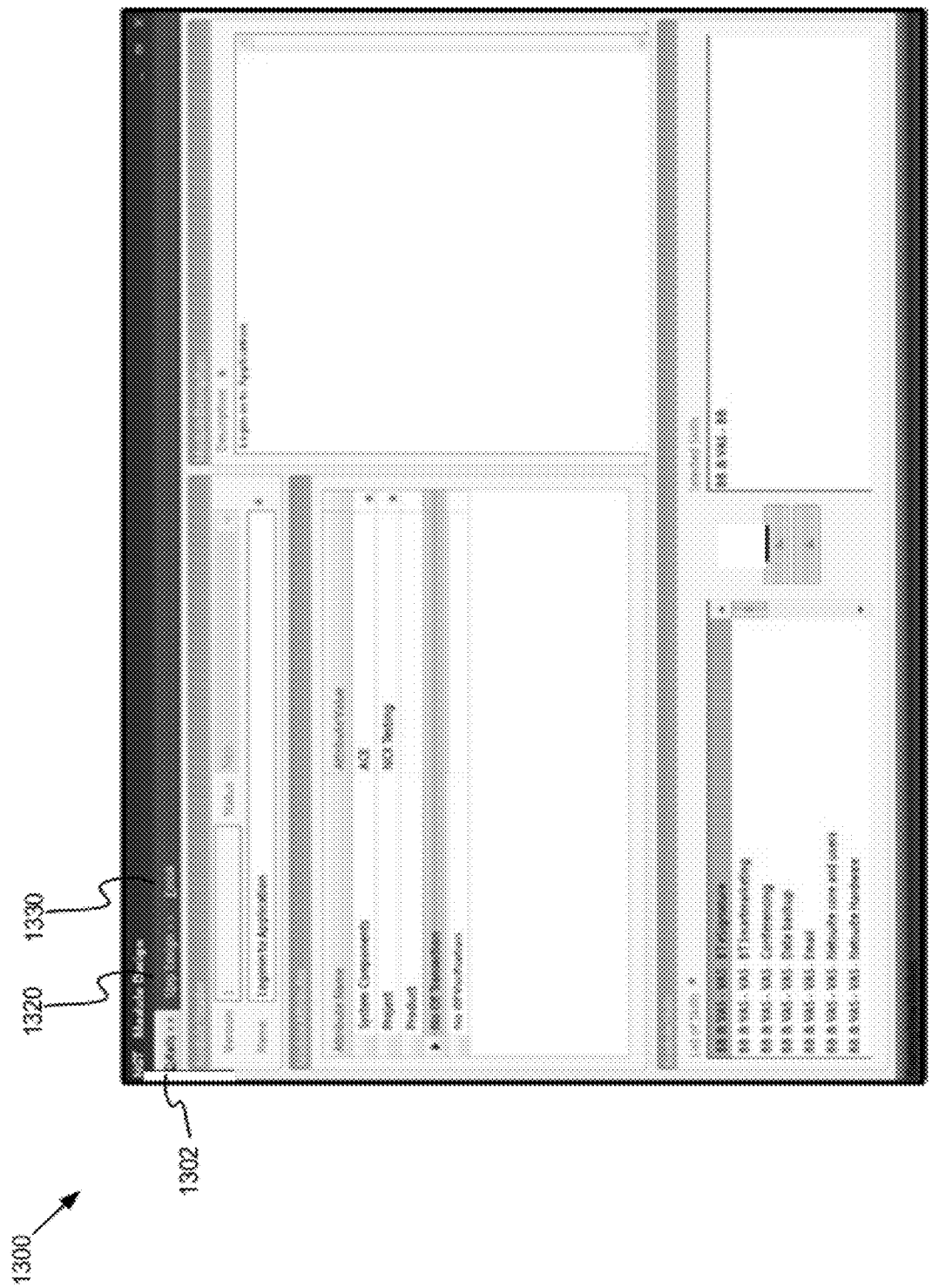

FIG. 13 shows a diagram of a Module Designer in an embodiment of the MSD 106. When the tester chooses to create, edit or create a clone of a script, the MSD 106 may display the Module Designer 1300. The Module Designer may include a plurality of screens, or tabs, to guide the user through creating a new module. The Module Designer 1300 may include a Details tab 1114, a Step Design tab 1320, and a Finish tab 1330. The Details tab 1114 may prompt the tester to enter a module name, names and values for module attributes, a description of the module, and skills required to execute the script and approve the module. The Module Designer 1300 may provide a list of skills from which the user may select the required skills for testing the module.

The Step Design tab 1320 may guide the tester through adding steps to the module. The Step Design tab 1320 may prompt the tester to input information regarding a description, parameters and expected results for each step in the module. Parameters may be embedded in the steps using notations, such as ">>>Input<<<" for inputs and "<<<Output>>>" for output parameters. The list of parameters may be updated as each step is entered. The user continues to enter the expected result for the step and specify whether test evidence should be captured for that step. This process is repeated for the remaining steps in the module. The tester may also insert steps and add steps using the Step Design tab 1320. The Finish tab 1330 may display to the user a module summary page and allows the tester to submit the module, save a draft of the module, add the module as a favorite, or cancel creation of the module. A module saved as a draft may not be added to any scripts.

An exemplary module may be a "View Billing" module that allows a user to view information or details regarding the user's account. A test step for the "View Billing" module may be "Click on the 'Account Tab'," for which the expected result is "Account tab should open." Another test step may be "Click on the 'Account Details' link," for which the expected result is "Summarized account details should be shown." Another test step may be "Click 'View more,'" for which the expected result is "All account details should be displayed."

In another embodiment of the MSD 106, a user interface may include drop down menus to allow the user to input other information about the script. For example, the user may describe the likelihood of failure and impact of failure for the script, and based on the user's description, the system may calculate a risk based testing score for the script. For example, a user may select from among Low, Medium, High and Very High drop down choices on a drop down menu for "likelihood of failure" and from among Low, Medium, High and Very High drop down choices on a drop down menu for "impact of failure." A configurable list of attributes is then completed. These attributes can be directly linked to an underlying test tool (e.g. HP QC fields).

In yet another embodiment, a tester may search for the type of test data that will be required for the script. The user may select test data that is required to execute the test, input a description of the required test data, and input additional comments about the data type. The user may input additional comments about the specific configuration of the test data required. For example, the user may specify "Customer must have an open order." The MSD 106 may further require the tester to input certain data for the script. The required data may include, for example, customer type (e.g., business or consumer), address type, and product (e.g., landline, broadband, or mobile phone. The MSD 106 may require the tester to input fewer, additional, or other data for the script.

Figure 14:
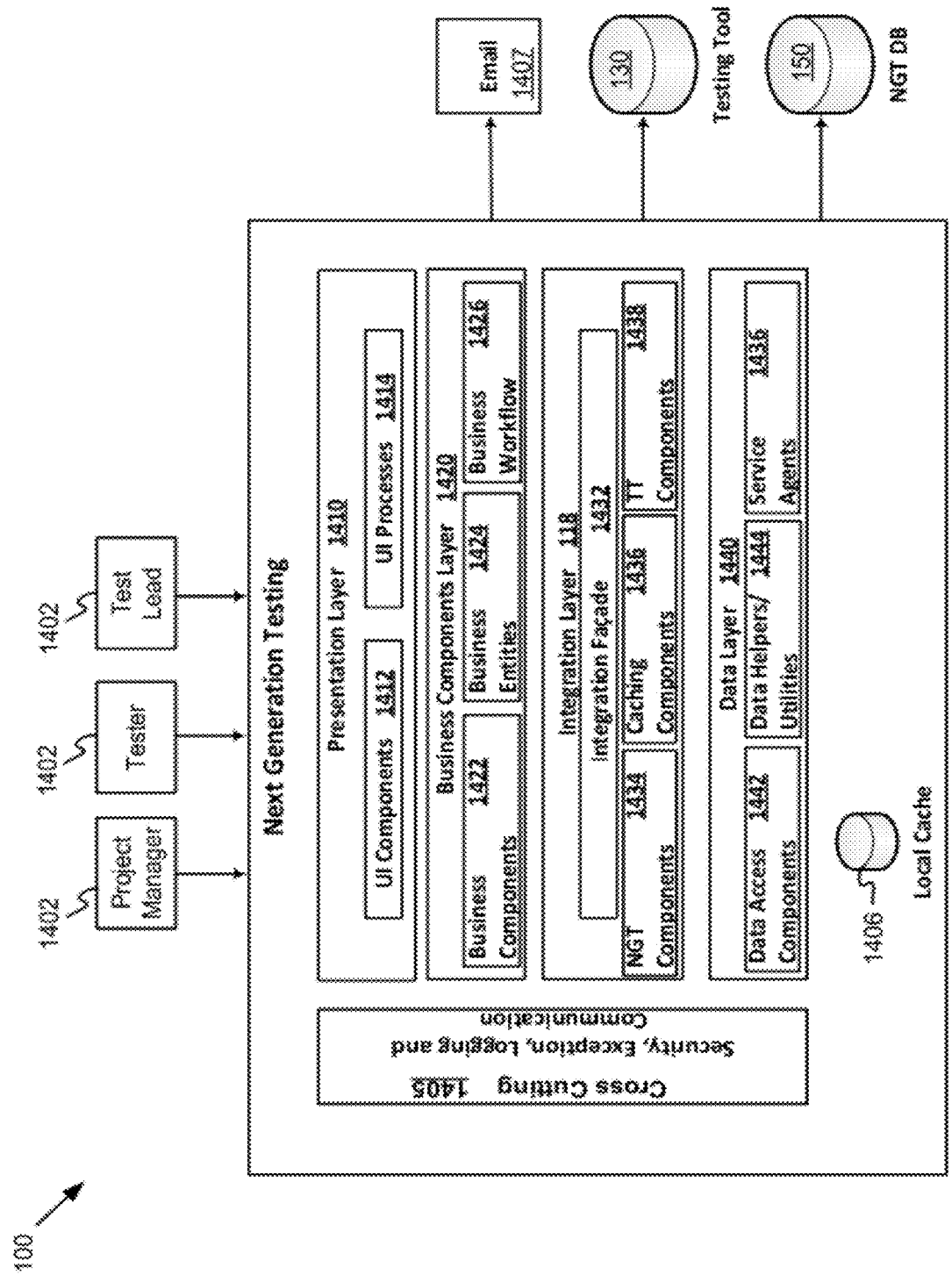
FIG. 14 shows a conceptual diagram of an embodiment of the NGT system.

FIG. 14 shows a conceptual diagram of an embodiment of the NGT system 100. As shown in FIG. 14, the NGT system 100 may include a presentation layer 1410, a business component layer 1420, an integration layer 118, and a data layer 1440. The presentation layer 1410 includes user interface (UI) components 1412 which render and format data for display to users 1402, including project managers, testers, and test leads, and acquire and validate data that users 1402 enter. The presentation layer 1410 also includes UI process components 1414 that drive the process using separate user process components to avoid hard coding the process flow and state management logic in the UI elements themselves. The business components layer 1420 implements business logic and workflow. The business components layer 1420 includes business components 1422 which implement the business logic of the application. The business components layer 1420 also includes business entities 1424 and business workflow 1426. Business entities are data transfer objects in the business components layer 1420. These are common objects that can be used across the layers, including the presentation layer 1410, to pass data around.

The integration layer 118 provides backend agnostic access to the upstream layers (business components layer 1420 and presentation layer 1410), and enables plug-ability via a common interface to one or more backend systems such as QC, Rational and Team Foundation Server. Integration layer 118 implements the following design pattern: an abstract base class inherits from ProvideBase (which is a class available with Microsoft's .Net framework); each concrete implementer in turn inherits from the abstract class above; Appropriated Provider (which may be an NGT component that communicates with a backend system, such as QC) is loaded based on type definition in a .config file. The integration layer 118 also includes the integration façade. Integration façade exposes a simplified interface to the business components layer 1420, and reads data from a combination of data transfer objects from one or more backend repository or cache (R2) and merges them to a common super data transfer object to return to the business components layer 1420. Integration layer 118 also includes NGT components 1434 which interface between the integration façade 1432 and the data layer 1440 and may provide mapping functionality for the integration layer 118 if required. The integration layer 118 also includes caching components 1436 and testing tool components 1438. Testing tool components 1438 are providers servicing requests for data read/write from a Testing Tool 1404.

The data layer 1440 includes data access components 1442 which centralize the logic necessary to access underlying NGT data store, exposing methods to allow easier and transparent access to the database. It also includes data helper/utilities 1444 which are used to centralizing generic data access functionality such as managing database connections. The data layer 1440 also includes service agents 1436 which provide Windows Communication Foundation services proxy for talking to application server services. The data layer 1440 may be an Enterprise Library Data Access Application Block or a custom designed data layer. Alternatively, object relational mapping tools, such as Entity Spaces (available from EntitySpaces, LLP), Genome (available from TechTalk, GmbH), LINQ-to-SQL (available from Microsoft Corporation), Entity Framework (also available from Microsoft Corporation), or LLBLGen Pro (available from Solutions Design), may be used to generate the data layer 1440 components.

Cross cutting functions 1405 in the NGT 100 may include, for example, security, exceptions handling, locking, and communication. The NGT 100 may also include a local cache 1406. Outputs from the NGT 100 may include, for example, email functionality 1407 or other information communication functionality. Emails may include notifications to testers regarding script rejection or approval, notifications to approvers regarding scripts that are ready for review, and notifications regarding security concerns, system exceptions, and auditing. The NGT 100 may also communicate information to testing tool 130 and an NGT database 150.

Figure 15:
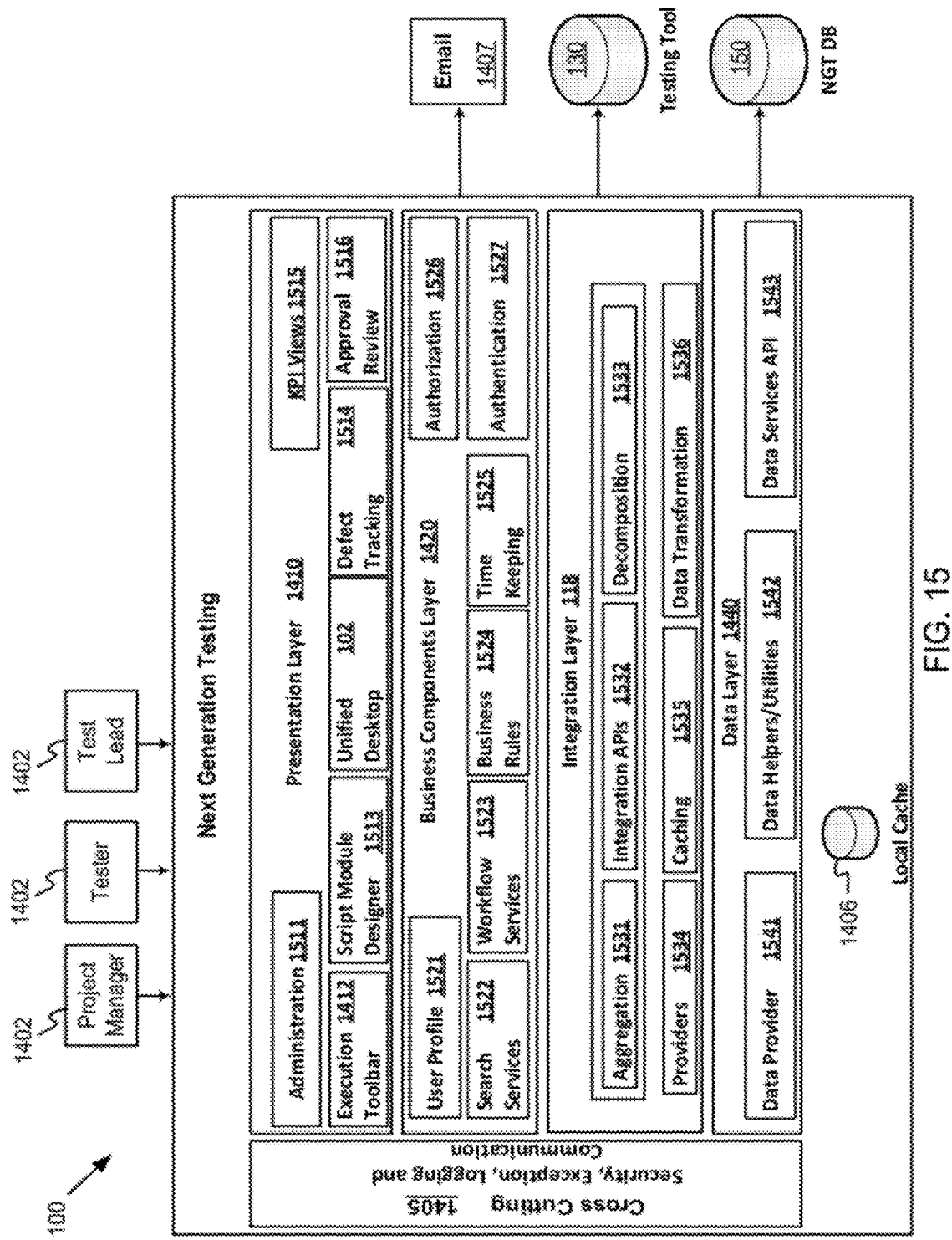
FIG. 15 shows a logical diagram of an embodiment of the NGT system.

FIG. 15 shows a logical diagram of an embodiment of the NGT system 100. In the embodiment, the presentation layer 1410 may include a plurality of UI components 1412 and UI processes 1414, including an administration interface 1511, an execution toolbar 1512, a script module designer 1513, a unified desktop 102, a defect tracking interface 1514, KPI views 1515, and an approval review interface 1516. The business components layer 1420 may include a plurality of components, including a user profile component 1521, a search services component 1522, a workflow services component 1523, a business rules component 1524, a time keeping component 1525, an authorisation component 1526, and an authentication component 1527. The integration layer 118 may include an integration façade 1432, which may include aggregation 1531, integration APIs 1532, and decomposition 1533. The integration layer 118 may also include providers 1534, caching 1535, and data transformation 1535. The data layer 1440 may provide access to a data provider 1541, data helper/utilities 1542, and data services API 1543.

The MSD 106 may have a centralized workflow system for approving/rejecting modules and scripts. When a module is created or modified, the MSD 106 notifies an approver to review the module. The approver may choose to approve the module to be used in all scripts, for a subset of scripts, or for a single script.

When the approver approves a module change for all scripts, the MSD 106 sets the status indicator of the module to approved for use. The new version of the module is updated against all scripts containing the previous version of the module. If the approver indicates that the test scripts will require review after the update, MSD 106 sets the status indicator of the script to pending review.

When the approver approves a module change for a subset of scripts, the MSD 106 prompts the user to enter a new name for the module, and clones the module by creating a new module identifier, linking the new module to the existing module, and setting the status indicator of the new module to approved for use. The MSD 106 associates, or adds, the new cloned module to the subset of scripts selected by the approver. The approver may choose whether the scripts require review following addition of the new module to the selected subset of scripts.

When the approver rejects a module, the MSD 106 prompts the approver to enter a reason for rejection, marks the module as rejected, and allows the approver to suggest a replacement module to the testers. Then, the MSD 106 sends a notification, for example, by email, to the tester to notify the tester that the module is rejected. Then, the MSD 106 may allow the tester to update and resubmit the module, or remove the module from the script.

The MSD 106 also provides a script approval process. When a new script is created, the MSD 106 sets the status indicator of the new script to pending review. The MSD 106 assigns a reviewer to review the script. When the reviewer approves the script, the MSD 106 sets the status indicator of the script to ready for test if all modules in the script are approved for use. If some of the modules in the script are pending approval, the MSD 106 may set the status indicator of the script to pending module approval.

When a script is updated, the person updating the script may indicate whether the script requires review and the MSD 106 sets the status indicator of the script to pending review. Then, the MSD 106 sends notification to the reviewer to review the script. If the reviewer approves the script, the MSD 106 sets the status indicator of the script to ready for test if all modules in the script are approved for use. If some of the modules are still pending approval, the MSD 106 sets the status indicator of the script to pending module approval, until all modules in the script are approved for use. If the person updating the script indicates that the script does not require review, the MSD 106 sets the status indicator of the script to ready for test if all modules in the script are approved for use. If some of the modules are still pending approval, the MSD 106 sets the status indicator of the script to pending module approval, until all modules in the script are approved for use.

Figure 16:
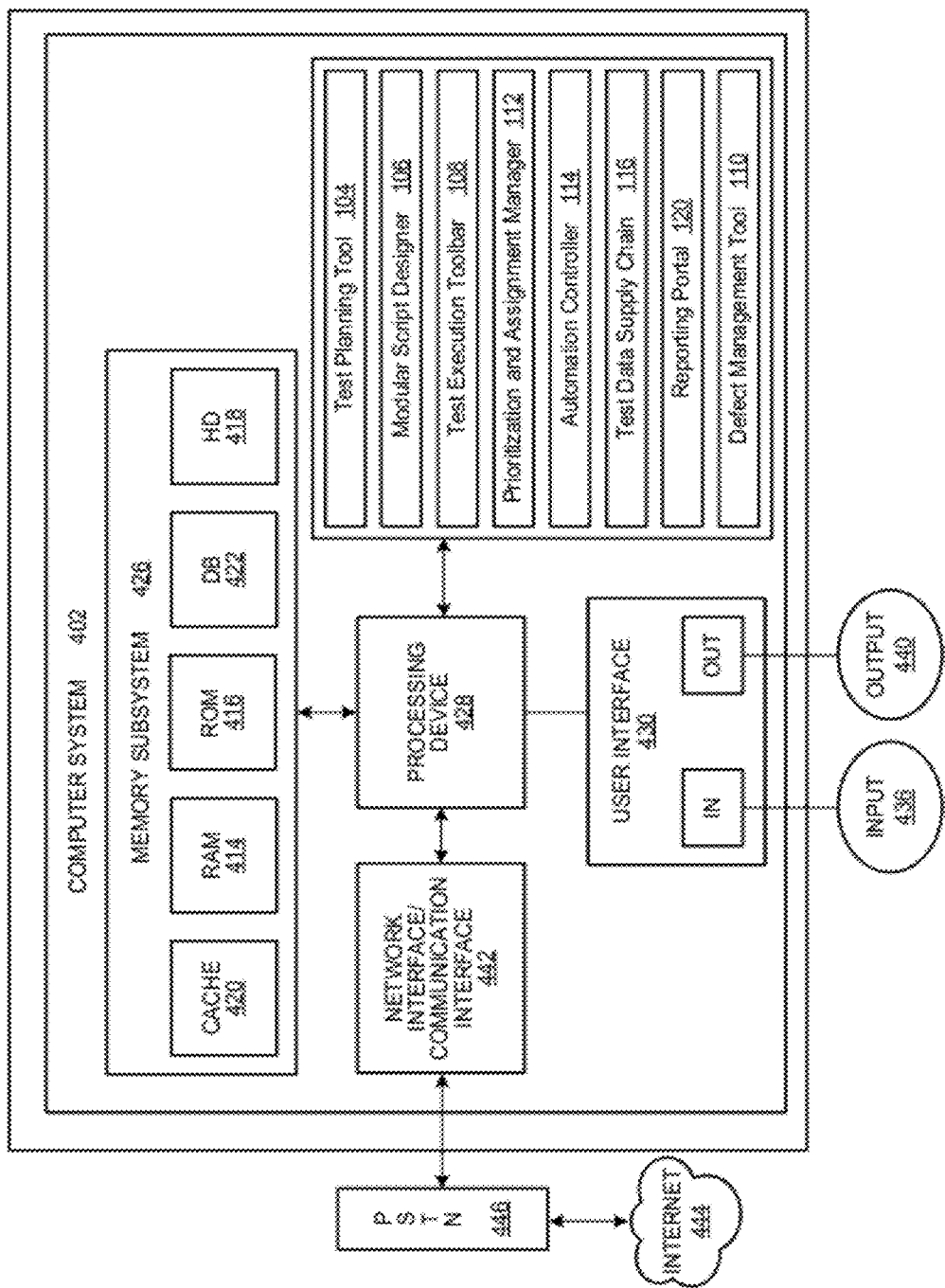
FIG. 16 is a high-level hardware block diagram of another embodiment of the NGT system.

FIG. 16 is a high-level hardware block diagram of another embodiment of the NGT system. The NGT system 100 and its key components 104, 106, 108, 114, 116, 120, and 110 may be embodied as a system cooperating with computer hardware components, such as a processing device 428, and/or as computer-implemented methods. The NGT system 100 may include a plurality of software components or subsystems. The components or subsystems, such as the test planning tool 104, the modular script designer 106, the prioritization and assignment manager 112, the test execution toolbar 108, the automation controller 114, the test data supply chain 116, the reporting portal 120, and/or the defect management tool 110, may be implemented in hardware, software, firmware, or any combination of hardware, software, and firmware, and may or may not reside within a single physical or logical space. For example, the modules or subsystems referred to in this document and which may or may not be shown in the drawings, may be remotely located from each other and may be coupled by a communication network.

The logic, circuitry, and processing described above may be encoded in a computer-readable medium such as a CDROM, disk, flash memory, RAM or ROM, an electromagnetic signal, or other machine-readable medium as instructions for execution by a processor. Alternatively or additionally, the logic may be implemented as analog or digital logic using hardware, such as one or more integrated circuits, or one or more processors executing instructions; or in software in an application programming interface (API) or in a Dynamic Link Library (DLL), functions available in a shared memory or defined as local or remote procedure calls; or as a combination of hardware and software.

The logic may be represented in (e.g., stored on or in) a computer-readable medium, machine-readable medium, propagated-signal medium, and/or signal-bearing medium. The media may comprise any device that contains, stores, communicates, propagates, or transports executable instructions for use by or in connection with an instruction executable system, apparatus, or device. The machine-readable medium may selectively be, but is not limited to, an electronic, magnetic, optical, electromagnetic, or infrared signal or a semiconductor system, apparatus, device, or propagation medium. A non-exhaustive list of examples of a machine-readable medium includes: a magnetic or optical disk, a volatile memory such as a Random Access Memory "RAM," a Read-Only Memory "ROM," an Erasable Programmable Read-Only Memory (i.e., EPROM) or Flash memory, or an optical fiber. A machine-readable medium may also include a tangible medium upon which executable instructions are printed, as the logic may be electronically stored as an image or in another format (e.g., through an optical scan) and then compiled and/or interpreted or otherwise processed. The processed medium may then be stored in a computer and/or machine memory.

The systems may include additional or different logic and may be implemented in many different ways. A controller may be implemented as a microprocessor, microcontroller, application specific integrated circuit (ASIC), discrete logic, or a combination of other types of circuits or logic. Similarly, memories may be DRAM, SRAM, Flash, or other types of memory. Parameters (e.g., conditions and thresholds) and other data structures may be separately stored and managed, may be incorporated into a single memory or database, or may be logically and physically organized in many different ways. Programs and instruction sets may be parts of a single program, separate programs, or distributed across several memories and processors.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

We claim:

1. A method for modular script design, comprising:
   receiving, at a modular script designer component, script information for a modular script, where the script information comprises user submitted script information;
   determining that the modular script is empty of modules;
   providing a list of popular first modules responsive to determining that the modular script is empty of modules;
   receiving a selection of a selected first module from the list of popular first modules;
   including the selected first module as a first module of the modular script;
   determining a last module listed in the modular script;
   generating a list of suggested next modules based on the last module listed in the modular script responsive to determining the last module listed in the modular script, the generating including determining a commonly added next module that commonly follows the last module by analyzing a database comprising a plurality of modules and a plurality of scripts and including the commonly added next module in the list of suggested next modules;
   receiving, at the modular script designer component, a selection of a selected next module from a user, the selection of the selected next module comprising:
      selecting the selected next module from among the list of the suggested next modules or a request to create a new module; and
      generating the new module if the selection of the selected next module includes the request to create the new module;
      receiving, from the user, a modification to the new module;
      obtaining manual approval of the modification from an approver, the approver being a peer of the user, where the obtained manual approval of the modification corresponds to a subset of the plurality of scripts; and
      adding the selected next module to the modular script as a new last module listed in the script.

2. The method of claim 1, wherein generating the new module comprises:
   receiving new module information from the user, and
   generating the new module based on the new module information; and
   the method further comprises:
   obtaining approval of the new module from the approver, and
   updating, when approval is obtained from the approver, the database to include the new module.

3. The method of claim 1, wherein the user submitted script information further comprises test step information, expected result information, required tester skill information, and required data type information.

4. The method of claim 1, wherein generating the new module comprises:
   receiving a selection of a stored module from the user,
   generating the new module by cloning the selected stored module and editing the cloned selected stored module; and
   the method further comprises:
   obtaining approval of the new module from the approver, and
   updating, when approval is obtained from the approver, the database to include the new module.

5. The method of claim 1, wherein the new module information comprises:
   required tester skill information, and
   the approver is selected based on skills of the approver and the required tester skill information.

6. A method for modular script design comprising:
   receiving, at a modular script designer component, script information for a modular script from a user, where the script information comprises user submitted script information;
   analyzing a database including a plurality of modules and a plurality of scripts to determine a list of popular first modules based on the script information, and displaying the list of popular first modules to the user;
   receiving, at the modular script designer component, a selection of a selected first module from the user, where the selected first module is selected from among the list of the popular first modules;
   adding the selected first module to the modular script;
   determining a last module listed in the modular script;
   generating a list of suggested next modules based on the last module listed in the modular script responsive to determining the last module listed in the modular script, wherein the generating includes the modular script designer component determining a commonly added next module that commonly follows the last module, based on the order of modules in other existing scripts, and displaying the list of suggested next modules to the user;
   receiving, at the modular script designer component, a selection of a selected next module from the user, the selection of the selected next module comprising:
      selecting the selected next module from among the list of suggested next modules or a request to create a new module;
   generating the new module if the selection of the selected next module includes the request to create the new module;
   receiving, from the user, a modification to the new module;
   obtaining manual approval of the modification from an approver, the approver being a peer of the user, where the obtained manual approval of the modification corresponds to a subset of the plurality of scripts; and adding the selected next module to the modular script as a new last module listed in the script.

7. The method of claim 6, wherein the user submitted script information comprises test step information, expected result information, required tester skill information, and required data type information.

8. The method of claim 6, wherein
generating the new module comprises:
receiving new module information from the user, and
generating the new module based on the new module information; and
the method further comprises:
obtaining approval of the new module from the approver, the approver being selected based on skills of the approver and the required tester skill information, and
updating, when approval is obtained from the approver, the database to include the new module.

9. The method of claim 6, wherein
generating the new module comprises:
receiving a selection of a stored module from the user, and
generating the new module by cloning the selected stored module and editing the cloned selected stored module; and
the method further comprises:
obtaining approval of the new module from the approver, and
updating, when approval is obtained from the approver, the database to include the new module.

10. A system for modular script design, comprising:
a computer processor; and
a memory in communication with the computer processor, the memory comprising logic for a modular script designer component, where the logic when executed by the computer processor causes the computer processor to:
receive, at the modular script designer component, script information for a modular script from a user, where the script information comprises user submitted script information;
determine that the modular script is empty of modules;
provide a list of popular first modules responsive to determining that the modular script is empty of modules;
receive a selection of a selected first module from the list of popular first modules;
include the selected first module as a first module of the modular script;
determine a last module listed in the modular script;
generate a list of suggested next modules based on the last module listed in the modular script responsive to determining the last module listed in the modular script, the generating including determining a commonly added next module that commonly follows the last module by analyzing a database comprising a plurality of modules and a plurality of scripts and including the commonly added next module in the list of suggested next modules;
receive, at the modular script designer component, a selection of a selected next module from the user, the selection of the selected next module comprising:
selecting the selected next module from among the list of suggested modules or requesting the creation of a new module;
generate the new module if the selection of the selected next module comprises the request to create the new module;
receive from the user, a modification to the new module;
obtain manual approval of the modification from an approver, the approver being a peer of the user; and
add the selected next module to the modular script as a new last module listed in the script.

11. The system of claim 10, further comprising:
receiving, from the user, a modification to the new module;
obtaining approval of the modification from the approver, where the obtained approval of the modification is for a subset of the plurality of scripts;
updating the subset of the plurality of scripts to include the approved modification.

12. The system of claim 10, wherein generating the new module comprises:
receiving new module information from the user, and
generating the new module based on the new module information;
obtaining approval of the new module from the approver, and
updating, when approval is obtained from the approver, the database to include the new module.

13. The system of claim 10, wherein the user submitted script information comprises test step information, expected result information, required tester skill information, and required data type information.

14. The system of claim 10, wherein
generating the new module comprises:
receiving a selection of a stored module from the user, and
generating the new module by cloning the selected stored module and editing the cloned selected stored module;
obtaining approval of the new module from the approver, and
updating, when approval is obtained from the approver, the database to include the new module.

15. The system of claim 12, wherein the new module information comprises:
required tester skill information, and
the approver is selected based on skills of the approver and the required tester skill information.

* * * * *